(12) United States Patent
Murahashi

(10) Patent No.: US 9,558,535 B2
(45) Date of Patent: Jan. 31, 2017

(54) IMAGE PROCESSING DEVICE, IMAGE PROCESSING METHOD, IMAGE PROCESSING PROGRAM, AND IMAGE DISPLAY DEVICE

(71) Applicant: Sharp Kabushiki Kaisha, Osaka-shi, Osaka (JP)

(72) Inventor: Yoshimitsu Murahashi, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/420,016

(22) PCT Filed: Jul. 25, 2013

(86) PCT No.: PCT/JP2013/070169
§ 371 (c)(1),
(2) Date: Feb. 6, 2015

(87) PCT Pub. No.: WO2014/024691
PCT Pub. Date: Feb. 13, 2014

(65) Prior Publication Data
US 2015/0228058 A1    Aug. 13, 2015

(30) Foreign Application Priority Data

Aug. 7, 2012    (JP) ................. 2012-174810

(51) Int. Cl.
*G06K 9/40* (2006.01)
*G06T 5/00* (2006.01)
(Continued)

(52) U.S. Cl.
CPC .............. *G06T 5/002* (2013.01); *G06T 5/20* (2013.01); *G09G 5/00* (2013.01); *G09G 5/026* (2013.01);
(Continued)

(58) Field of Classification Search
CPC ....... H04N 1/4092; H04N 1/409; G06T 5/002; G06T 2207/20192; G06T 5/20; G09G 2340/145; G09G 5/026; G09G 2340/0407; G09G 2340/0442; G09G 2340/14; G09G 5/00
(Continued)

(56) References Cited

U.S. PATENT DOCUMENTS 6,014,463 A  *  1/2000  Hirabayashi ......... H04N 19/593
                                                     358/3.29
6,754,398 B1     6/2004  Yamada
(Continued)

FOREIGN PATENT DOCUMENTS

JP  08-163408    *  6/1996
JP  08-163408 A     6/1996
(Continued)

OTHER PUBLICATIONS

Official Communication issued in International Patent Application No. PCT/JP2013/070169, mailed on Oct. 8, 2013.

*Primary Examiner* — Yon Couso
(74) *Attorney, Agent, or Firm* — Keating & Bennett, LLP

(57) ABSTRACT

An image processing device according to one embodiment of the invention includes a contour direction estimating unit, a direction evaluating unit, a reference region weighting processing unit, and a composition operation unit. The contour direction estimating unit estimates a contour direction in which signal values of pixels are constant values for each pixel, the direction evaluating unit decides an evaluation value of each reference pixel of the pixel based on the contour direction of the pixel estimated by the contour direction estimating unit and the contour direction of each reference pixel serving as a pixel in a reference region corresponding to the pixel for each pixel, the reference region weighting processing unit decides a weighting coef-
(Continued)

ficient of the reference pixel based on the contour direction of the pixel estimated by the contour direction estimating unit and the direction of each reference pixel of the pixel from the pixel, and the composition operation unit smoothes a signal value of the pixel based on the evaluation value decided by the direction evaluating unit and the weighting coefficient decided by the reference region weighting processing unit using a signal value of the reference pixel of the pixel.

15 Claims, 20 Drawing Sheets

(51) Int. Cl.
*G06T 5/20* (2006.01)
*H04N 1/409* (2006.01)
*G09G 5/00* (2006.01)
*G09G 5/02* (2006.01)

(52) U.S. Cl.
CPC ............ *H04N 1/409* (2013.01); *H04N 1/4092* (2013.01); *G06T 2207/20192* (2013.01); *G09G 2340/0407* (2013.01); *G09G 2340/0442* (2013.01); *G09G 2340/14* (2013.01); *G09G 2340/145* (2013.01)

(58) Field of Classification Search
USPC .......................................................... 382/254
See application file for complete search history.

(56) References Cited

U.S. PATENT DOCUMENTS

| | | | |
|---|---|---|---|
| 2005/0135700 A1* | 6/2005 | Anderson | ............... G06T 5/002 382/261 |
| 2005/0276506 A1 | 12/2005 | Kwon et al. | |
| 2007/0116373 A1 | 5/2007 | Hwang et al. | |
| 2009/0214133 A1* | 8/2009 | Aoyama | ............... H04N 19/86 382/268 |
| 2010/0272340 A1 | 10/2010 | Bar-Aviv et al. | |
| 2014/0314333 A1* | 10/2014 | Takahashi | ............ A61B 6/5258 382/264 |

FOREIGN PATENT DOCUMENTS

| | | |
|---|---|---|
| JP | 2001-057677 A | 2/2001 |
| JP | 2005-353068 A | 12/2005 |
| JP | 2007-149092 A | 6/2007 |
| JP | 2011-508334 A | 3/2011 |

* cited by examiner

IMAGE 86    IMAGE 87

IMAGE 88    IMAGE 89

IMAGE 90    IMAGE 91

IMAGE 92

IMAGE 93

IMAGE 94

IMAGE PROCESSING DEVICE, IMAGE PROCESSING METHOD, IMAGE PROCESSING PROGRAM, AND IMAGE DISPLAY DEVICE

TECHNICAL FIELD

The present invention relates to an image processing device, an image processing method, an image processing program, and an image display device.

Priority is claimed on Japanese Patent Application No. 2012-174810, filed on Aug. 7, 2012, the content of which is incorporated herein by reference.

BACKGROUND ART

There is a demand for effectively utilizing image content by enabling image content created under various conditions with the spread of an information communication technology to be viewed under a condition different from a condition when created. For example, in an Internet protocol television (IPTV) or the like, there are cases in which image content (a so-called network moving image) of relatively low resolution that is originally created to be viewed through a mobile terminal device or the like is displayed on an image display device of high resolution. Here, image content having resolution of 640 pixels (a horizontal direction)×360 pixels (a vertical direction) is displayed on a display that supports a full high definition (HD) standard of 1920 pixels (the horizontal direction)×1080 pixels (the vertical direction). In this case, resolution may be converted into high resolution by interpolating a signal value of each pixel included in image content between pixels (this is also referred to as up-scaling or up-conversion).

For this reason, there are cases in which the following noises are remarkably shown in an image whose resolution is increased:

(1) jaggy: a step-like contour shown in a slant line or a curved line;

(2) mosquito noise: wave-like noise shown in a portion in which a contrasting density or color signal value abruptly changes or its vicinity when a compression-coded code is decoded; and (3) dot interference: noise shown in a granular form in a boundary in which a color changes when separation (YC separation) of a brightness signal and a color-difference signal from a composite signal is inappropriate.

In this regard, in a processing device disclosed in Patent Literature 1, a window of a certain size is set on an input current frame/field based on a current pixel, an eigenvalue and an eigenvector used to determine characteristics of the window are calculated, the characteristics of the window are determined based on the calculated eigenvalue, a filtering weighted value to be applied is decided based on the determination result, and filtering is performed on the window based on the calculated eigenvector and the decided filtering weighted value. The eigenvector includes a first eigenvector indicating a gradient direction and a second eigenvector indicating an edge direction, and the eigenvalue includes a first eigenvalue indicating dispersion in the gradient direction and a second eigenvalue indicating dispersion in the edge direction. Further, when a ratio of the first eigenvalue and the second eigenvalue is a first threshold value or less, the window is determined to be a corner region, and the filtering weighted value is set to 0, whereas the ratio is the second threshold value or larger, the window is determined to be an edge region, and the filtering weighted value is set to 1.

CITATION LIST

Patent Literature

Patent Literature 1: JP 2005-353068 A

SUMMARY OF INVENTION

Technical Problem

However, in the processing device disclosed in Patent Literature 1, there was a problem in that a huge computation amount is necessary to calculate the eigenvalue and the eigenvector. Further, when edges (for example, corner ends, fine line drawings, or the like) in different directions are included in one window, the ratio of the first eigenvalue and the second eigenvalue is reduced, and the edges are increasingly determined to be corner regions. Thus, it was difficult to remove or reduce noise such as a jaggy without performing filtering substantively.

The invention provides an image processing device, an image processing method, an image processing program, and an image display device, which are capable of removing or reducing noise without requiring a huge computation amount.

Solution to Problem (1) An image processing device according to an aspect of the invention, includes: a contour direction estimating unit that estimates a contour direction in which signal values are constant values for each pixel; a direction evaluating unit that decides an evaluation value of each reference pixel of the pixel based on the contour direction of the pixel estimated by the contour direction estimating unit and a contour direction of each reference pixel serving as a pixel in a reference region corresponding to the pixel for each pixel; a reference region weighting processing unit that decides a weighting coefficient of the reference pixel based on the contour direction of the pixel estimated by the contour direction estimating unit and a direction of each reference pixel of the pixel from the pixel; and a composition operation unit that smoothes a signal value of the pixel based on the evaluation value decided by the direction evaluating unit and the weighting coefficient decided by the reference region weighting processing unit using a signal value of the reference pixel of the pixel.

(2) According to the image processing device described above, the reference region weighting processing unit may be configured to decide the weighting coefficient of the reference pixel in a direction of a predetermined range from the contour direction of the pixel to be a value larger than the weighting coefficient of the reference pixel in the direction outside the predetermined range.

(3) According to the image processing device described above, the direction evaluating unit may be configured to decide the evaluation value such that the evaluation value increases as a difference between the contour direction of the pixel and the contour direction of the reference pixel of the pixel decreases.

(4) According to the image processing device described above, the composition operation unit may be configured to smooth the signal value of the pixel based on a differential value between the signal value of each reference pixel corresponding to the pixel and the signal value of the pixel.

(5) According to the image processing device described above, the composition operation unit may be configured to smooth the signal value of the pixel using the weighting coefficient of each reference pixel in the direction of the predetermined range from the contour direction of the pixel and the evaluation value.

(6) An image display device according to another aspect of the invention, the image display device includes: a contour direction estimating unit that estimates a contour direction in which signal values are constant values for each pixel; a direction evaluating unit that decides an evaluation value of each reference pixel of the pixel based on the contour direction of the pixel estimated by the contour direction estimating unit and a contour direction of each reference pixel serving as a pixel in a reference region corresponding to the pixel for each pixel; a reference region weighting processing unit that decides a weighting coefficient of the reference pixel based on the contour direction of the pixel estimated by the contour direction estimating unit and a direction of each reference pixel of the pixel from the pixel; and a composition operation unit that smoothes a signal value of the pixel based on the evaluation value decided by the direction evaluating unit and the weighting coefficient decided by the reference region weighting processing unit using a signal value of the reference pixel of the pixel.

(7) An image processing method according to another aspect of the invention is a method of an image processing device, the method includes: a process of estimating a contour direction in which signal values are constant values for each pixel through the image processing device; a process of deciding an evaluation value of each reference pixel of the pixel based on the estimated contour direction of the pixel and a contour direction of each reference pixel serving as a pixel in a reference region corresponding to the pixel for each pixel through the image processing device; a process of deciding a weighting coefficient of the reference pixel based on the estimated contour direction of the pixel and a direction of each reference pixel of the pixel from the pixel through the image processing device; and a process of smoothing a signal value of the pixel based on the decided evaluation value and the decided weighting coefficient using a signal value of the reference pixel of the pixel through the image processing device.

(8) An image processing program according to another aspect of the invention causes a computer of an image processing device to execute: a process of estimating a contour direction in which signal values are constant values for each pixel; a process of deciding an evaluation value of each reference pixel of the pixel based on the estimated contour direction of the pixel and a contour direction of each reference pixel serving as a pixel in a reference region corresponding to the pixel for each pixel; a process of deciding a weighting coefficient of the reference pixel based on the estimated contour direction of the pixel and a direction of each reference pixel of the pixel from the pixel; and a process of smoothing a signal value of the pixel based on the decided evaluation value and the decided weighting coefficient using a signal value of the reference pixel of the pixel.

Advantageous Effects of Invention

According to the embodiments of the invention, it is possible to remove or reduce noise without requiring a huge computation amount.

DESCRIPTION OF EMBODIMENTS

Hereinafter, embodiments of the invention will be described in detail with reference to the appended drawings.

Figure 1:
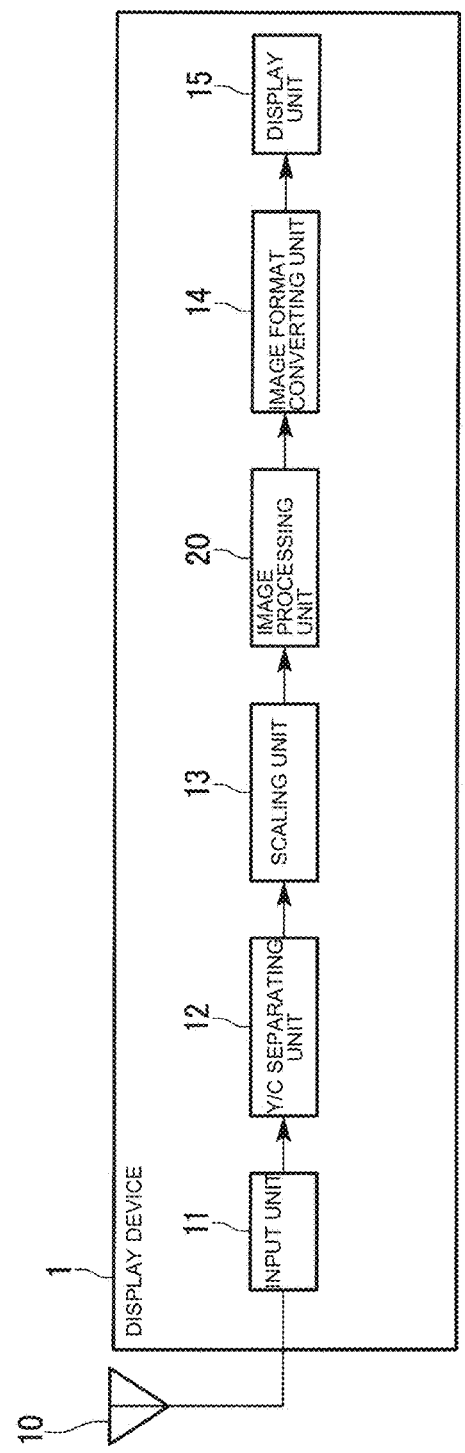
FIG. 1 is a schematic diagram illustrating a configuration of a display device according to an embodiment of the invention.

FIG. 1 is a schematic diagram illustrating a configuration of a display device 1 according to an embodiment of the invention.

The display device 1 includes an input unit 11, Y/C (brightness signal/color-difference signal) separating unit 12, a scaling unit 13, an image processing unit 20, an image format converting unit 14, and a display unit 15. The display device 1 is connected to an antenna 10. The antenna 10 receives a high frequency signal as a radio wave related to, for example, television broadcasting, and outputs the received high frequency signal to the display device 1.

An external image signal is input to the input unit 11. For example, the input unit 11 extracts a modulation signal related to a channel designated from the high frequency signal input through the antenna 10, and converts the extracted modulation signal into a modulation signal of a base frequency band. The input unit 11 outputs the converted modulation signal to the Y/C separating unit 12.

The Y/C separating unit 12 demodulates the modulation signal input from the input unit 11, generates an image signal, and separates a brightness signal Y, a color-difference signal Cb, and a color-difference signal Cr that are analog signals from the generated image signal. The Y/C separating unit 12 converts the separated signals from the analog signals to digital signals at a predetermined sampling frequency. The Y/C separating unit 12 outputs an image signal including the brightness signal Y, the color-difference signal Cb, and the color-difference signal Cr that are converted digital signals to the scaling unit 13.

When the resolution (the number of pixels) of the image signal input from the Y/C separating unit 12 is different from the resolution of the display unit 15, the scaling unit 13 adjusts (scales) the resolution of the input image signal so that the resolution of the image signal is equal to the resolution of the display unit 15. When the resolution of the display unit 15 is higher than the resolution of the input image signal, the scaling unit 13 performs interpolation on the input image signal. When the resolution of the display unit 15 is lower than the resolution of the input image signal, the scaling unit 13 performs down sampling on the input image signal. For example, the scaling unit 13 uses a scheme such as a bicubic technique or a bilinear technique as a scheme for interpolation or down sampling. The scaling unit 13 outputs the image signal having the adjusted resolution to the image processing unit 20. When the resolution of the input image signal is equal to the resolution of the display unit 15, the input image signal is output to the image processing unit 20.

In the following description, a ratio of the number of pixels of the display unit 15 in the horizontal direction (or the vertical direction) to the number of pixels of the input image signal in the horizontal direction (or the vertical direction) is referred to as an enlargement factor. For example, when the resolution of the input image signal is 640 pixels (the horizontal direction)×360 pixels (the vertical direction), and the resolution of the display unit 15 is 1920 pixels (the horizontal direction)×1080 pixels (the vertical direction), the enlargement factor is 3.

The image processing unit 20 performs processing related to noise reduction on the brightness signal Y among the image signals input from the scaling unit 13, and generates a brightness signal Y" indicating an image in which noise is reduced. The image processing unit 20 updates the brightness signal Y input from the scaling unit 13 to the generated brightness signal Y", and synchronizes the brightness signal Y" with the color-difference signals Cb and Cr. The image processing unit 20 outputs an image signal including the brightness signal Y" and the color-difference signals Cb and Cr to the image format converting unit 14. A configuration and processing of the image processing unit 20 will be described later.

The image format converting unit 14 converts a format of the image signal input from the image processing unit 20. When the input image signal is an interlace signal, the image format converting unit 14 converts the format of the image signal into a progressive signal. The interlace signal is a signal obtained by scanning pixels in every other columns in the horizontal direction of the pixel, and a signal in which a scanning target column differs according to a frame. The progressive signal is a signal obtained by scanning pixels in every column in the horizontal direction of the pixel. The image format converting unit 14 converts the input image signal or the image signal having the converted format into an image signal (for example, an RGB signal: an image signal including signal values of red (R), green (G), and blue (B) colors) represented by a color system supported by the display unit 15, and outputs the converted image signal to the display unit 15.

The display unit 15 displays an image indicated by the image signal input from the image format converting unit 14. For example, the display unit 15 is a liquid crystal display (LCD) of a full high definition (which is also referred to as full HD) scheme, that is, an LCD having resolution of 1920 pixels (the horizontal direction)×1080 pixels (the vertical direction). The display unit 15 includes pixel elements of red, green, and blue colors that are arranged two-dimensionally. As a result, the display unit 15 emits, for example, backlight light through the pixel elements at a brightness according to signal values of the pixels indicated by the input image signal, and displays a color image.

(Configuration of Image Processing Unit 20)

Next, a configuration of the image processing unit 20 will be described.

Figure 2:
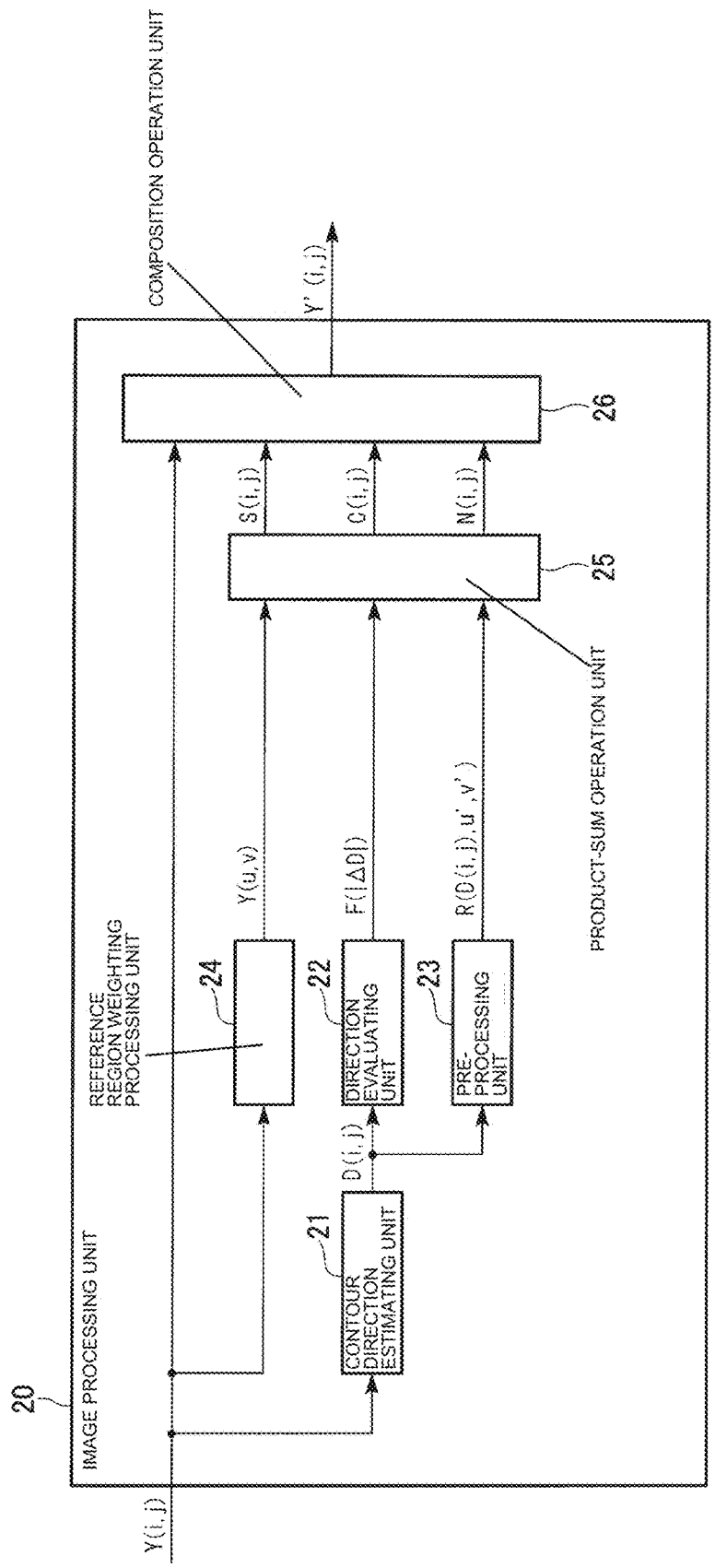
FIG. 2 is a schematic diagram illustrating a configuration of an image processing unit according to the present embodiment.

FIG. 2 is a schematic diagram illustrating a configuration of the image processing unit 20 according to the present embodiment.

The image processing unit 20 includes a contour direction estimating unit 21, a direction evaluating unit 22, a reference region weighting processing unit 23, a pre-processing unit 24, a product-sum operation unit 25, and a composition operation unit 26.

The contour direction estimating unit 21 estimates a contour direction of each pixel based on a signal value (a brightness value) of each pixel indicated by the brightness signal Y input from the scaling unit 13. The contour direction refers to a direction perpendicular to a normal line of a line serving as a contour, that is, a tangential direction of a line serving as a contour. A line serving as a contour represents a light indicating a space in which a signal value is substantially constant, and may be a curved line or a straight line. Thus, a contour is not limited to a region in which a signal value changes abruptly according to a change in a position. A relation between a line serving as a contour and a signal value corresponds to a relation between a contour line and an altitude. Since a position of each pixel is given discretely or influenced by noise around a contour serving as an improvement target in the invention such as jaggy, dot interference, and mosquito noise, there are cases in which it is difficult to decide a contour direction using a line passing between pixels having constant signal values as a line serving as a contour. Here, a signal value is assumed to be differentiable (that is, continuous) in a space representing coordinates of each pixel. The contour direction estimating unit 21 calculates a contour direction θ based on a differential value of a signal value in the horizontal direction or the vertical direction, for example, based on Formula (1) for each pixel.

[Mathematical Formula 1]

$$\theta = \tan^{-1}(-[\partial Y(x,y)/\partial x]/[\partial Y(x,y)/\partial y]) \quad (1)$$

In Formula (1), the contour direction θ is a counterclockwise angle based on the horizontal direction (the x direction). x and y are coordinates in the horizontal direction and the vertical direction, respectively. $Y(x,y)$ is a signal value at the coordinates $(x,y)$. In other words, the contour direction θ is calculated as an angle providing a tangent value obtained by dividing a partial differential of the signal value $Y(x,y)$ in the x direction by a partial differential of the signal value $Y(x,y)$ in the y direction. Formula (1) can be derived from a relation in which the signal value $Y(x,y)$ is constant although the coordinates $(x,y)$ are different. Here, $G_x(x,y)$ and $G_y(x,y)$ indicate the partial differential of the signal value $Y(x,y)$ in the x direction and the partial differential of the signal value $Y(x,y)$ in the y direction, respectively. In the following description, $G_x(x,y)$ and $G_y(x,y)$ are also referred to as an x direction partial differential and a y direction partial differential, respectively.

Unless otherwise set forth in the following description, a position (coordinates) of a pixel (i,j) indicates a center of gravity point of the pixel. A variable a in the position of the pixel is indicated by $a(i,j)$ or the like.

For example, the contour direction estimating unit 21 calculates an x direction partial differential $G_x(i,j)$ and a y direction partial differential $G_y(i,j)$ of the signal value $Y(i,j)$ of each pixel (i,j) using Formulae (2) and (3).

[Mathematical Formula 2]

$$G_x(i,j) = \sum_{u',v'} Y(u,v) W_x(u',v') \quad (2)$$

[Mathematical Formula 3]

$$G_y(i,j) = \sum_{u',v'} Y(u,v) W_y(u',v') \quad (3)$$

In Formulae (2) and (3), i and j are integer values indicating an index of a pixel of interest in the x direction and the y direction, respectively. A pixel of interest is a pixel attracting attention as a direct processing target. $W_x(u',v')$ and $W_y(u',v')$ indicate filter coefficients of the x direction and y direction differential filters, respectively. u and v are integer values indicating an index of a reference pixel in the x direction and the y direction, respectively. A reference pixel is a pixel that is in a range decided according to a predetermined rule based on a pixel of interest and referred to when processing on a pixel of interest is performed. A reference pixel includes a pixel of interest. u' and v' are integer values indicating an index of a reference pixel in the x direction and the y direction when a pixel of interest is assumed as an original point, respectively. Thus, u=i+u' and v=j+v' are held.

For example, the differential filter has the filter coefficients $W_x(u',v')$ and $W_y(u',v')$ for each of (u',v')s of a total of (2n+1)·(2n+1) reference pixels, that is, 2n+1 reference pixels in the x direction and 2n+1 reference pixels in the y direction. In the following description, a region to which the reference pixel given the filter coefficient belongs is also referred to as a reference region. n is an integer value (for example, 2) larger than 1. Here, the filter coefficients $W_x(u',v')$ and $W_y(u',v')$ are 1 for a reference pixel in a positive direction based on a pixel of interest, are 0 for a reference pixel having a coordinate value in the same differential direction (the x direction) as a pixel of interest, and are −1 for a reference pixel in a negative direction based on a pixel of interest. In other words, the filter coefficient $W_x(u',v')$ of the x direction differential filter is 1 (0<u'≤n), 0 (u'=0), or −1 (0>u'≥−n). The filter coefficient $W_y(u',v')$ of the y direction differential filter is 1 (0<v'≤n), 0 (v'=0), or −1 (0>v≤−n). Further, n is an integer value that is equal to an enlargement factor of an image or larger than the enlargement factor. Thus, since the signal value is smoothed in the positive direction and the negative direction based on the pixel of interest, when a direction of a contour is estimated, there is little influence of noise around a contour such as jaggy, mosquito noise, or dot interference. Here, when n is large and a reference pixel away from a pixel of interest is considered, there are cases in which a partial differential value serving as a local value originally is not properly calculated. Thus, n is decided to be a value smaller than a predetermined maximum value, for example, an integer value equal to an enlargement factor, an integer value obtained by rounding up a digit after a decimal point of an enlargement factor, or a value that is larger than any of the integer values by a predetermined value.

The contour direction estimating unit 21 quantizes the contour direction θ(i,j) calculated based on the calculated x direction partial differential $G_x(i,j)$ and the y direction partial differential $G_y(i,j)$, and calculates a quantization contour direction $D(i,j)$ indicating the quantized contour direction. The contour direction estimating unit 21 calculates the quantization contour direction $D(i,j)$, for example, using Formula (4).

[Mathematical Formula 4]

$$D(i,j) = \text{round}\left(\frac{N_d}{\pi}\tan^{-1}(G_y(i,j)/G_x(i,j))\right) \quad (4)$$

In Formula (4), round ( . . . ) is a rounding function that provides an integer value obtained by rounding off a digit after a decimal point of a real number . . . , $N_d$ is a constant indicating a number (a quantization contour direction number) of the quantized contour direction. For example, the quantization contour direction number $N_d$ is any of values of 8 to 32. In other words, the quantization contour direction $D(i,j)$ is indicated by any of integers of 0 to $N_d−1$ obtained by rounding a value obtained by dividing the contour direction θ by a quantization interval of $\pi/N_d$. As a result, a degree of freedom of the contour direction θ is restricted, and a processing load which will be described later is reduced. Further, in order to avoid division by zero, when an absolute value $|G_x(i,j)|$ of the x direction partial differential $G_x(i,j)$ is smaller than a predetermined small real number value (for example, $10^{-6}$), π/2 is used as $\tan^{-1}$. Depending on an arithmetic processing system, in order to avoid an error caused by the above division or division by zero, there are cases in which a tangent function having two parameters of $G_x$ and $G_y$ is prepared, but $\tan^{-1}$ may be obtained using the parameters.

The contour direction estimating unit 21 outputs quantization contour direction information indicating the calculated quantization contour direction $D(i,j)$ to the direction evaluating unit 22 and the reference region weighting processing unit 23.

The direction evaluating unit 22 calculates a direction evaluation value of each reference pixel belonging to a reference region centering on a pixel of interest based on the quantization contour direction of each pixel indicated by the quantization contour direction information input from the contour direction estimating unit 21 for each pixel of interest. Here, the direction evaluating unit 22 decides the direction evaluation value of the reference pixel such that as the difference between the quantization contour direction $D(i,j)$ of the pixel of interest $(i,j)$ and the quantization contour direction $D(u,v)$ of the reference pixel $(u,v)$ decreases, the direction evaluation value increases. For example, the direction evaluating unit 22 calculates a differential value $\Delta D = D(u,v) - D(i,j)$ between the quantization contour direction $D(i,j)$ for the pixel of interest $(i,j)$ and the quantization contour direction $D(u,v)$ for the reference pixel $(u,v)$. Here, when the differential value $\Delta D$ is 0, that is, when $D(u,v)$ is equal to $D(i,j)$, a direction evaluation value $F(|\Delta D|)$ is decided to be a maximum value 1. When the differential value $\Delta D$ is not 0, that is, when $D(u,v)$ is not equal to $D(i,j)$, the direction evaluation value $F(|\Delta D|)$ is decided to be a minimum value 0.

The direction evaluating unit 22 may decide the direction evaluation value $F(\Delta D)$ such that as the quantization contour direction $D(i,j)$ for the pixel of interest $(i,j)$ approximates to the quantization contour direction $D(u,v)$ for the reference pixel $(u,v)$, that is, as an absolute value $|\Delta D|$ of the differential value $\Delta D$ decreases, the direction evaluation value $F(\Delta D)$ increases. For example, the direction evaluating unit 22 decides $F(0)=1$, $F(1)=0.75$, $F(2)=0.5$, $F(3)=0.25$, and $F(|\Delta D|)=0(|\Delta D|>3)$.

Here, when one of the quantization contour direction $D(i,j)$ and the quantization contour direction $D(u,v)$ is larger than $N_d/2$, and the other is smaller than $N_d/2$, since the absolute value $|\Delta D|$ increases although the respective contour directions approximate to each other, there are cases in which an erroneous direction evaluation value $F(\Delta D)$ is calculated. For example, when $D(i,j)$ is 7, and $D(u,v)$ is 0, $|\Delta D|$ is 7. However, the difference between the quantization contour directions is $\pi/8$, and $|\Delta D|$ has to be decided to be 1 originally. In this regard, when one of the quantization contour direction $D(i,j)$ and the quantization contour direction $D(u,v)$ is larger than $N_d/2$, the direction evaluating unit 22 adds $N_d$ to a value of the other quantization contour direction, and calculates a corrective value. The direction evaluating unit 22 calculates an absolute value of a differential value between the calculated corrective value and one quantization contour direction. As a result, a desired direction evaluation value is decided using the calculated absolute value as $|\Delta D|$ described above.

In the product-sum operation unit 25 which will be described later, as the direction evaluation value $F(|\Delta D|)$ is used, influence by the reference pixel $(u,v)$ having the contour direction different from the contour direction of the pixel of interest $(i,j)$ can be ignored or disregarded.

Even in the direction evaluating unit 22, the size of the reference region to which the reference pixel $(u,v)$ belongs, that is, the number of pixels in the horizontal direction or the vertical direction is preferably $2n+1$ or larger. Further, the size of the reference region in the direction evaluating unit 22 may be different from the size of the reference region in the contour direction estimating unit 21. For example, the number of pixels of the reference region in the horizontal direction and the vertical direction in the direction evaluating unit 22 may be 7, respectively, whereas the number of pixels of the reference region in the horizontal direction and the vertical direction in the contour direction estimating unit 21 may be 5, respectively.

The direction evaluating unit 22 outputs direction evaluation value information indicating the direction evaluation value $F(\Delta D)$ of each reference pixel $(u,v)$ for each pixel of interest $(i,j)$ to the product-sum operation unit 25. An exemplary numerical value of the direction evaluation value $F(\Delta D)$ will be described later.

The reference region weighting processing unit 23 decides reference region weighting information for each pixel of interest $(i,j)$ based on the quantization contour direction $D(i,j)$ of each pixel indicated by the quantization contour direction information input from the contour direction estimating unit 21. The reference region weighting information is information indicating a weighting coefficient $R(D(i,j),u',v')$ of each reference pixel $(u',v')$ belonging to a reference region centering on a certain pixel of interest $(i,j)$. This weighting coefficient is also referred to as a reference region weighting. The size of the reference region in the reference region weighting processing unit 23 is decided in advance to be equal to the size of the reference region in the direction evaluating unit 22.

The reference region weighting processing unit 23 decides a value larger than the weighting coefficients of the reference pixels in directions of the other ranges to be the weighting coefficient $R(D(i,j),u',v')$ of the reference pixel in a direction of a predetermined range from the quantization contour direction $D(i,j)$ of the pixel of interest $(i,j)$. For example, the reference region weighting processing unit 23 decides "1" as the weighting coefficient $R(D(i,j),u',v')$ of the reference pixel $(u',v')$ in the quantization contour direction or a direction approximating to the quantization contour direction from the pixel of interest $(i,j)$, and decides "0" as the weighting coefficients $R(D(i,j),u',v')$ of the reference pixel $(u',v')$ in the other directions. Specifically, the reference pixel in the quantization contour direction or a direction approximating to the quantization contour direction from the pixel of interest refers to the reference pixel $(u',v')$ in which a line segment extending from the center of the pixel of interest $(i,j)$ in the quantization contour direction passes through the region. The reference region weighting processing unit 23 may decide the weighting coefficient such that the weighting coefficient has a large value for the reference pixel $(u',v')$ in which a length of the line segment passing through the region is large.

Further, the weighting coefficient of each reference pixel in each quantization contour direction may be calculated in advance. The reference region weighting processing unit 23 includes a storage unit that stores in advance the reference region weighting information indicating the calculated weighting coefficient of each reference pixel in association with the quantization contour direction information. The reference region weighting processing unit 23 reads the reference region weighting information corresponding to the quantization contour direction indicated by the input quantization contour direction information from the storage unit.

The reference region weighting processing unit 23 outputs the reference region weighting information decided for each pixel of interest $(i,j)$ to the product-sum operation unit 25. An exemplary numerical value of the reference region weighting will be described later.

The pre-processing unit 24 extracts a brightness signal indicating the signal value $Y(u,v)$ of each reference pixel $(u,v)$ belonging to the reference region centering on the pixel of interest $(i,j)$ for each pixel of interest $(i,j)$ from the brightness signal Y input from the scaling unit 13. The pre-processing unit 24 outputs the brightness signal Y extracted for each pixel of interest (i,j) to the product-sum operation unit 25. The size of the reference region in the pre-processing unit 24 is decided in advance to be equal to the sizes of the reference regions in the direction evaluating unit 22 and the reference region weighting processing unit 23.

The product-sum operation unit 25 receives the direction evaluation value information, the reference region weighting information, and the brightness signal from the direction evaluating unit 22, the reference region weighting processing unit 23, and the pre-processing unit 24, respectively, for each pixel of interest (i,j).

The product-sum operation unit 25 calculates a product-sum value S(i,j), for example, using Formula (5) based on the direction evaluation value F(ΔD) indicated by the direction evaluation value information, the reference region weighting R(D(i,j),u',v') indicated by the reference region weighting information, and the signal value Y(u,v) indicated by the brightness signal.

[Mathematical Formula 5]

$$S(i, j) = \sum_{u',v'} F(|\Delta D|)R(D(i, j), u', v')Y(u, v) \quad (5)$$

Formula (5) represents that the product of the direction evaluation value F(|ΔD|), the reference region weighting R(D(i,j),u',v'), and the signal value Y(u,v) indicated by the brightness signal is calculated for each reference pixel, and the sum of the calculated products of the reference pixels belonging to the reference region is calculated as the product-sum value S(i,j). That is, in Formula (5), the product-sum value S(i,j) is considered to be calculated by weighting and adding the signal value Y(u,v) using the product of the direction evaluation value F(|ΔD|) and the reference region weighting R(D(i,j),u',v') as the weighting coefficient. The product of the direction evaluation value F(|ΔD|) and the reference region weighting R(D(i,j),u',v') is also referred to as a direction evaluation region weighting.

The product-sum operation unit 25 calculates a weighting area C(i,j), for example, using Formula (6) based on the direction evaluation value F(|ΔD|) indicated by the direction evaluation value information and the reference region weighting R(D(i,j),u',v') indicated by the reference region weighting information.

[Mathematical Formula 6]

$$C(i, j) = \sum_{u',v'} F(|\Delta D|)R(D(i, j), u', v') \quad (6)$$

Formula (6) represents that the product of the direction evaluation value F(|ΔD|) and the reference region weighting R(D(i,j),u',v') is calculated for each reference pixel, and the sum of the calculated products of the reference pixels belonging to the reference region is calculated as the weighting area C(i,j). That is, the weighting area C(i,j) indicates a value obtained by weighting the reference region weighting R(D(i,j),u',v') by the direction evaluation value F(|ΔD|) for each reference pixel, that is, the number of reference pixels that is actually referred to in the product-sum operation of Formula (5). In other words, Formula (6) represents the weighting area C(i,j) is calculated by obtaining the sum of the direction evaluation region weightings in the reference region. Further, the product-sum operation unit 25 calculates the sum of the reference region weightings R(D(i,j),u',v') indicated by the reference region weighting information for the reference pixels belonging to the reference region as a reference area N(i,j). The reference area N(i,j) indicates the number of reference pixels that are nominally referred to in the product-sum operation of Formula (5).

The product-sum operation unit 25 outputs product-sum value information indicating the product-sum value S(i,j) calculated for each pixel of interest (i,j), weighting area information indicating the weighting area C(i,j), and reference area information indicating the reference area N(i,j) to the composition operation unit 26.

The composition operation unit 26 receives the product-sum value information, the weighting area information, and the reference area information from the product-sum operation unit 25. The composition operation unit 26 calculates a direction smoothing value Y'(i,j) by dividing the product-sum value S(i,j) indicated by the product-sum value information by the weighting area C(i,j) indicated by the weighting area information. That is, the calculated direction smoothing value Y'(i,j) indicates a signal value smoothed between the reference pixels that are in the quantization contour direction of the pixel of interest (i,j) or the direction approximating to the quantization contour direction and have the contour direction that is the same as or approximates to the contour direction of the pixel of interest.

The composition operation unit 26 calculates a mixing ratio w(i,j) by dividing the weighting area C(i,j) by the reference area N(i,j) indicated by the reference area information. The mixing ratio w(i,j) indicates a ratio of the number of reference pixels having the contour direction that is the same or approximates to the contour direction of the pixel of interest to the number of reference pixels that are in the quantization contour direction of the pixel of interest (i,j) or the direction approximating to the quantization contour direction.

The composition operation unit 26 calculates a composite signal value Y"(i,j) by performing a weighting addition (a composition operation) on the direction smoothing value Y'(i,j) and the signal value Y(i,j) indicated by the brightness signal input from the scaling unit 13 using the mixing ratio w(i,j) and (1−w(i,j)), respectively. The weighting addition is represented by Formula (7).

[Mathematical Formula 7]

$$Y''(i,j)=w(i,j)Y'(i,j)+(1-w(i,j))Y(i,j) \quad (7)$$

The composition operation unit 26 generates the brightness signal Y" indicating the calculated composite signal value Y"(i,j).

(Exemplary Contour)

Next, an exemplary contour will be described.

Figure 3:
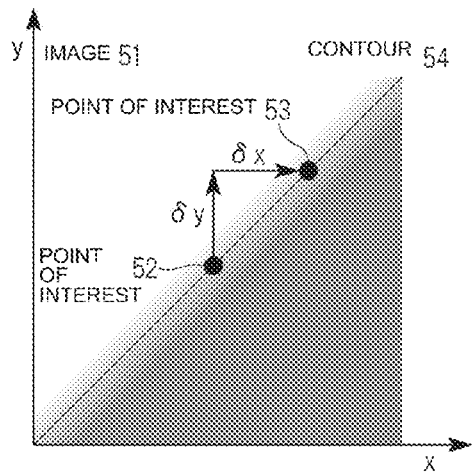
FIG. 3 is a conceptual diagram illustrating an exemplary contour.

FIG. 3 is a conceptual diagram illustrating an exemplary contour.

In FIG. 3, a horizontal axis denotes the x direction, and a vertical axis denotes the y direction. In an image 51, a magnitude of the signal value Y(x,y) is indicated by a contrasting density. A bright portion has a large signal value Y(x,y), and a dark portion has a small signal value Y(x,y).

A dotted line passing through points of interest 52 and 53 indicates a contour 54. The point of interest 53 is at a position away from the point of interest 52 by a small amount (δx,δy). The contour 54 is a line segment (a contour line) that passes through the point of interest 53 and indicates positions at which the signal values are equal to the signal value Y(x,y) of the point of interest 52. Generally, when the signal value Y(x,y) is assumed to be differentiable for the coordinates (x,y), a difference ΔY between a signal value Y(x+δx,y+δy) of the point of interest 53 and the signal value Y(x,y) of the point of interest 52 is the sum of a small change δx·$G_x$(x,y) in the x direction and a small change δy·$G_y$(x,y) in the y direction. Formula (1) is derived from a relation in which the contour 54 passes through both of the points of interest 52 and 53, that is, ΔY is 0. Thus, the contour direction estimating unit 21 can calculate the contour direction θ using Formulae (1) to (3) based on the signal values Y(i,j) of the pixels whose positions are spatially discrete.

(Exemplary Reference Region)

Next, an exemplary reference region will be described.

Figure 4:
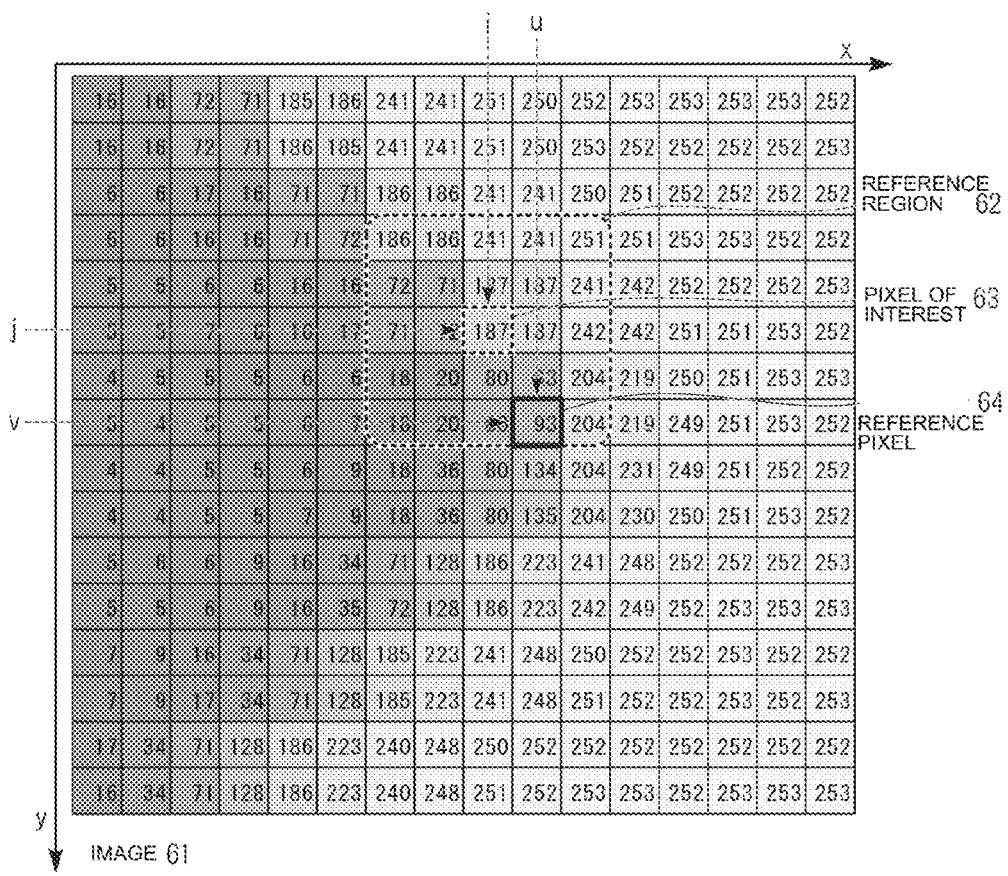
FIG. 4 is a conceptual diagram illustrating an exemplary reference region.

FIG. 4 is a conceptual diagram illustrating an exemplary reference region.

In FIG. 4, a horizontal axis denotes the x direction, and a vertical axis denotes the y direction. An image 61 is an image indicated by the brightness signal Y. Small quadrangles included in the image 61 indicate pixels. A numerical value shown in each quadrangle indicates the signal value Y(i,j) of each pixel. A contrasting density of each quadrangle indicates a magnitude of the signal value Y(i,j). A bright portion has a large signal value Y(i,j), and a dark portion has a small signal value Y(i,j). In FIG. 4, the signal values Y(i,j) at the left side are larger than those at the right side as a whole. Here, a boundary between a region having a large signal value Y(i,j) and a region having a small signal value Y(i,j) is inclined to the left side as it is closer to both upper and lower ends and inclined to the right side as it is closer to the center.

A region surrounded by a dotted line at an upper side from the central portion of the image 61 indicates a reference region 62. A quadrangle at the center of the reference region 62 indicates a pixel of interest 63. Arrows that are indicated by i and j serving as a starting point and directed toward the pixel of interest 63 indicate that an index of the pixel of interest 63 is (i,j). A quadrangle at a fourth column from a leftmost column of a bottom row of the reference region 62 indicates a reference pixel 64. Arrows that are indicated by u and v serving as a starting point and directed toward the reference pixel 64 indicate that an index of the reference pixel 64 is (u,v).

(Exemplary Differential Filter)

Next, an exemplary differential filter will be described.

Figure 5:
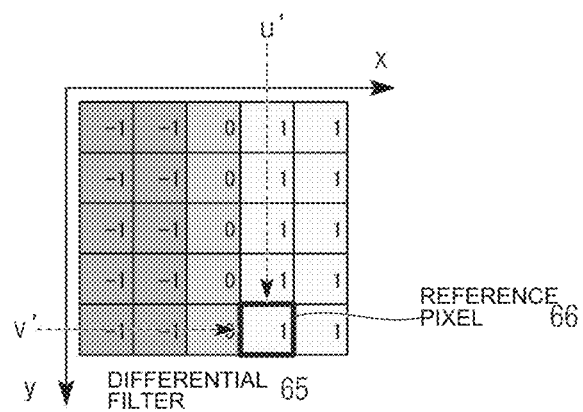
FIG. 5 is a conceptual diagram illustrating an exemplary x direction differential filter.

FIG. 5 is a conceptual diagram illustrating an exemplary x direction differential filter (a differential filter 65).

A relation of a horizontal axis and a vertical axis in FIG. 5 is the same as in FIG. 4.

Small quadrangles included in the differential filter 65 indicate reference pixels. The differential filter 65 is an x direction differential filter in which the number of pixels in the x direction and the number of pixels in the y direction are 5, respectively. A numerical value shown in each quadrangle indicates the filter coefficient $W_x$(u',v'). The filter coefficient $W_x$(u',v') is 1 when u'>0, 0 when u'=0, and −1 when u'<0. A quadrangle at a fourth column from a leftmost column of a bottom row of the differential filter 65 indicates a reference pixel 66. Arrows that are indicated by u' and v' serving as a starting point and directed toward the reference pixel 66 indicate that an index of the reference pixel 66 is (u',v'), and corresponds to the index (u,v) of the reference pixel 64 (FIG. 4). Thus, in the product-sum operation of Formula (2), a signal value 93 related to the reference pixel 64 is multiplied by the filter coefficient 1 related to the reference pixel 66.

Figure 6:
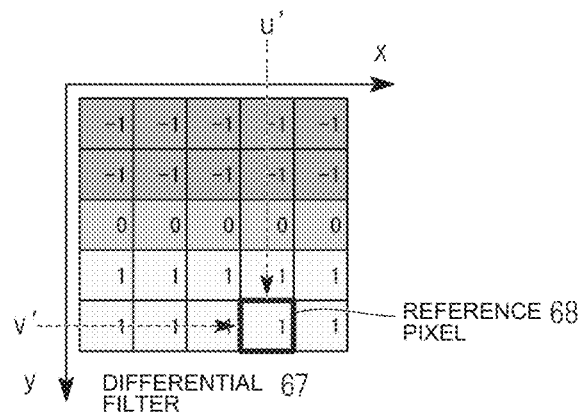
FIG. 6 is a conceptual diagram illustrating an exemplary y direction differential filter.

FIG. 6 is a conceptual diagram illustrating an exemplary y direction differential filter (a differential filter 67).

A relation of a horizontal axis and a vertical axis in FIG. 6 is the same as in FIG. 4.

Small quadrangles included in the differential filter 67 indicate reference pixels. The differential filter 67 is a vertical direction differential filter in which the number of pixels in the x direction and the number of pixels in the y direction are 5, respectively. A numerical value shown in each quadrangle indicates the filter coefficient $W_y$(u',v'). The filter coefficient $W_y$(u',v') is 1 when v'>0, 0 when v'=0, and −1 when v'<0. A quadrangle at a fourth column from a leftmost column of a bottom row of the differential filter 67 indicates a reference pixel 68. Arrows that are indicated by u' and v' serving as a starting point and directed toward the reference pixel 68 indicate that an index of the reference pixel 68 is (u',v'), and corresponds to the index (u,v) of the reference pixel 64 (FIG. 4). Thus, in the product-sum operation of Formula (3), the signal value 93 related to the reference pixel 64 is multiplied by the filter coefficient 1 related to the reference pixel 68.

(Exemplary Calculation of Partial Differential)

Figure 7:
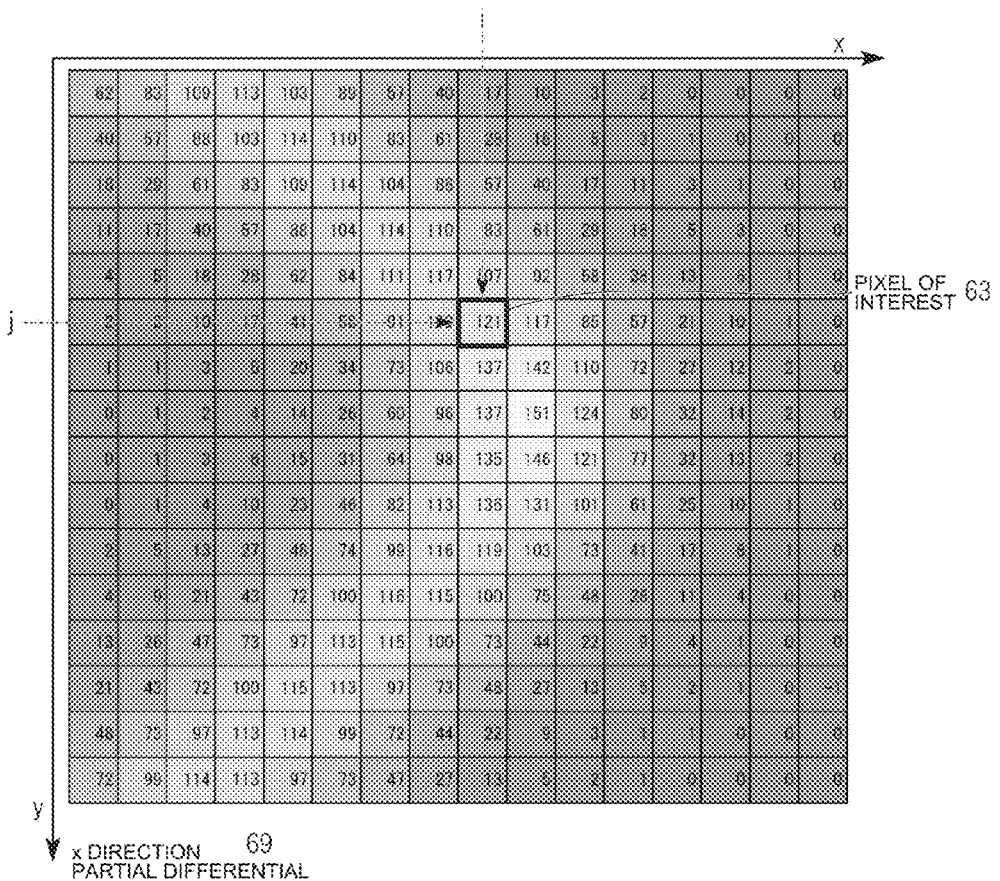
FIG. 7 is a conceptual diagram illustrating an exemplary x direction partial differential.

FIG. 7 is a conceptual diagram illustrating an exemplary x direction partial differential (an x direction partial differential 69).

A relation among a horizontal axis, a vertical axis, and the pixel of interest 63 in FIG. 7 is the same as in FIG. 4.

Small quadrangles included in the x direction partial differential 69 indicate pixel. A numerical value shown in each quadrangle indicates a value of the x direction partial differential $G_x$(i,j). The x direction partial differential $G_x$(i,j) illustrated in FIG. 7 is a value calculated using Formula (2) based on the signal value Y(i,j) illustrated in FIG. 4. A contrasting density of each quadrangle indicates a magnitude of the x direction partial differential $G_x$(i,j). A bright portion has a large x direction partial differential $G_x$(i,j), and a dark portion has a small x direction partial differential $G_x$(i,j). In FIG. 7, the x direction partial differentials $G_x$(i,j) at both left and right ends are small. Here, regions having a large x direction partial differential $G_x$(i,j) are inclined to the left side as it is closer to both upper and lower ends and inclined to the right side as it is closer to the center. This corresponds to what the boundary between the region having the large signal value Y(i,j) and the regions having the small signal value Y(i,j) is inclined to the left side as it is closer to both upper and lower ends and inclined to the right side as it is closer to the center in FIG. 4. The x direction partial differential $G_x$(i,j) of the pixel of interest 63 is 121.

Figures 8, 9:
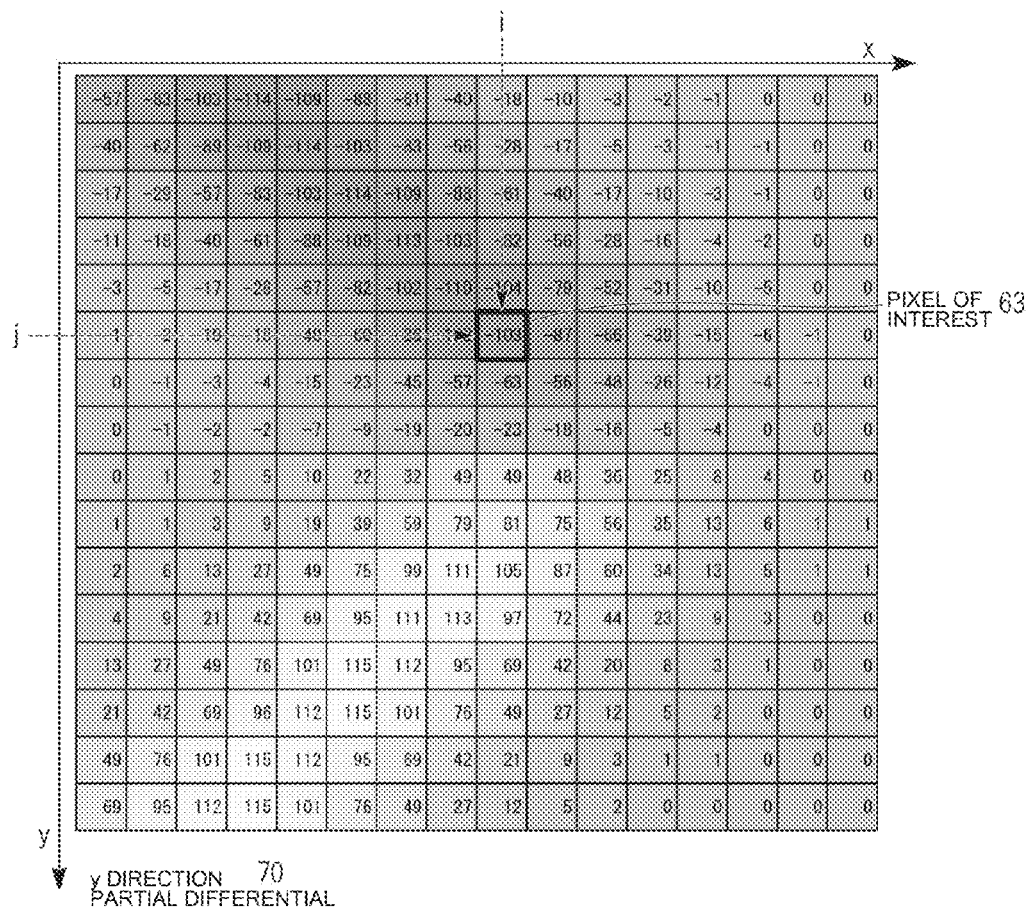
FIG. 8 is a conceptual diagram illustrating an exemplary y direction partial differential.
FIG. 9 an exemplary quantization contour direction candidate.

FIG. 8 is a conceptual diagram illustrating an exemplary y direction partial differential (a y direction partial differential 70).

A relation among a horizontal axis, a vertical axis, and the pixel of interest 63 in FIG. 8 is the same as in FIG. 4.

Small quadrangles included in the y direction partial differential 70 indicate pixels. A numerical value shown in each quadrangle indicate a value of the y direction partial differential $G_y$(i,j). The y direction partial differential $G_y$(i,j) illustrated in FIG. 8 is a value calculated using Formula (3) based on the signal value Y(i,j) illustrated in FIG. 4. A contrasting density of each quadrangle indicates a magnitude of the y direction partial differential $G_y$(i,j). A bright portion has a large y direction partial differential $G_y$(i,j), and a dark portion has a small y direction partial differential $G_y$(i,j). In FIG. 8, the y direction partial differential $G_y$(i,j) approximates to an intermediate value 0 at both left and right ends. Here, regions having the large y direction partial differential $G_y$(i,j) are inclined to the left side as it is closer to the lower end and inclined to the right side as it is closer to the center. Regions having the small y direction partial differential $G_y(i,j)$ are inclined to the left side as it is closer to the upper end and inclined to the right side as it is closer to the center. The regions having the large y direction partial differential $G_y(i,j)$ and the regions having the small y direction partial differential $G_y(i,j)$ are almost symmetric centering on the central axis in the y direction.

This corresponds to what the boundary between the regions having the large signal value $Y(i,j)$ and the regions having the small signal value $Y(i,j)$ is inclined to the left side as it is closer to both upper and lower ends and inclined to the right side as it is closer to the center in FIG. 4. The y direction partial differential $G_y(i,j)$ of the pixel of interest 63 is −103.

(Exemplary Contour Direction Calculation)

Next, an exemplary contour direction calculation will be described.

FIG. 9 illustrates exemplary quantization contour direction candidates.

In FIG. 9, a horizontal axis denotes the x direction, and a vertical axis denotes the y direction. In this example, the quantization contour direction number $N_d$ is 8. Arrows radially extending from one original point indicate quantization contour direction candidates, and a number at the end point of each arrow is a numerical value indicating the quantization contour direction. In other words, numerical values 0 to 7 indicate contour direction angles 0 to $7\pi/8$ or $\pi$ to $15\pi/8$. A region surrounded by a dotted line extending from an original point centering on each arrow indicates a range of the contour direction (before quantization) to be quantized in the quantization contour direction indicated by each arrow. For example, when the contour direction angle is included in any of 0 to $\pi/16$, $15\pi/16$ to $17\pi/16$, and $31\pi/16$ to $2\pi$, the numerical value indicating the quantization contour direction is 0.

Figure 10:
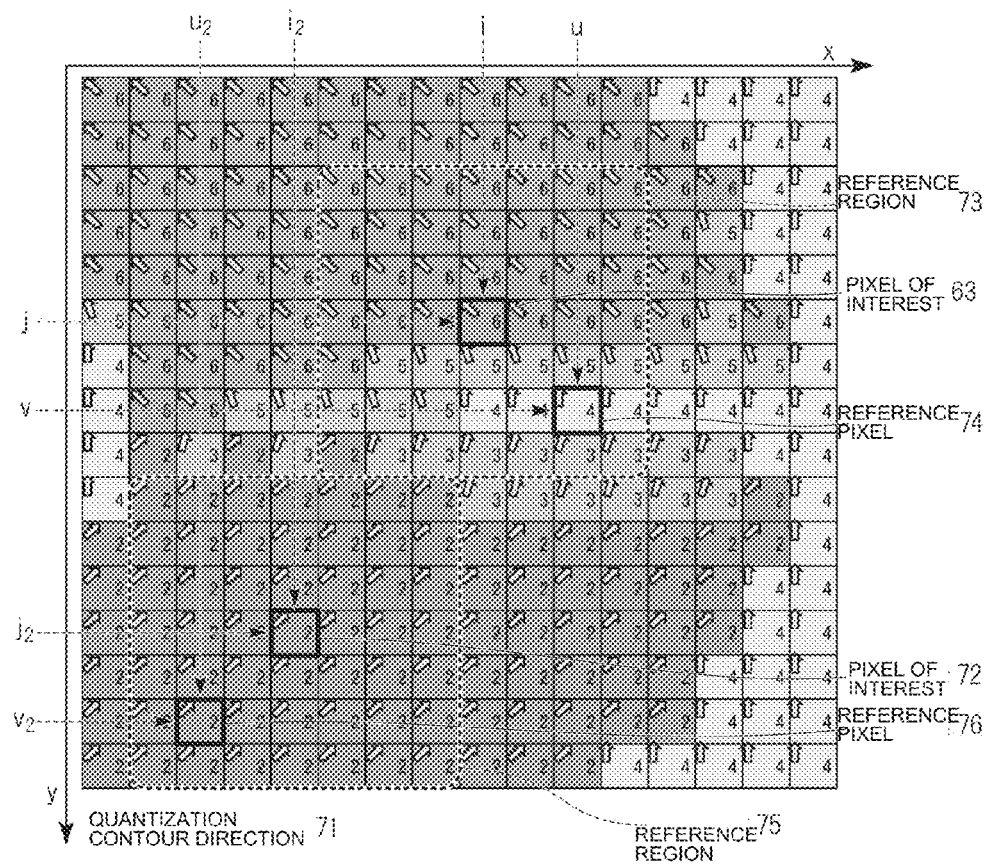
FIG. 10 is a conceptual diagram illustrating an exemplary quantization contour direction calculation.

FIG. 10 is a conceptual diagram illustrating an exemplary quantization contour direction calculation (a quantization contour direction 71).

A relation among a horizontal axis, a vertical axis, and the pixel of interest 63 in FIG. 10 is the same as in FIG. 4.

Small quadrangles included in the quantization contour direction 71 indicate pixels. Arrows that are indicated by $i_2$ and $j_2$ serving as a starting point and directed toward a pixel of interest 72 positioned in a left lower portion of the quantization contour direction 71 represent that an index of the pixel of interest 72 is $(i_2, j_2)$.

In FIG. 10, reference regions 73 and 75 are regions in which the number of pixels in the x direction centering on the pixel of interests 63 and 72 is 7, and the number of pixels in the y direction is 7. Arrows that are indicated by u and v serving as a starting point and directed toward a reference pixel 74 positioned in a right lower portion of the pixel of interest 63 represent that an index of the reference pixel 74 is (u,v). Arrows that are indicated by $u_2$ and $v_2$ serving as a starting point and directed toward a reference pixel 76 positioned in a left lower portion of the pixel of interest 72 represent that an index of the reference pixel 76 is $(u_2, v_2)$. The reference regions 73 and 75 and the reference pixels 74 and 76 will be described later.

A numerical value and an arrow shown in each quadrangle indicate a value of the quantization contour direction $D(i,j)$ and a contour direction indicated by the value. The quantization contour direction $D(i,j)$ illustrated in FIG. 10 is a value that is calculated using Formula (4) based on the x direction partial differential $G_x(i,j)$ illustrated in FIG. 7 and the y direction partial differential $G_y(i,j)$ illustrated in FIG. 8. As a result, the quantization contour direction in most of the pixels at the left upper side from the center of FIG. 10 is a left upper direction. The quantization contour direction in most of the pixels at the left lower side from the center is a right upper direction. This corresponding to what the boundary between the regions having the large signal value $Y(i,j)$ and the regions having the small signal value $Y(i,j)$ is inclined to the left side as it is closer to both upper and lower ends and inclined to the right side as it is closer to the center.

Here, the quantization contour direction $D(i,j)$ in the pixel of interest 63 is 6. Thus, the reference region weighting processing unit 23 selects the reference region weighting $R(6,u',v')$ for the pixel of interest 63. The quantization contour direction $D(i_2,j_2)$ in the pixel of interest 72 is 2. Thus, the reference region weighting processing unit 23 selects the reference region weighting $R(2,u',v')$ for the pixel of interest 72.

(Exemplary Reference Region Weighting)

Next, an exemplary reference region weighting will be described.

Figure 11:
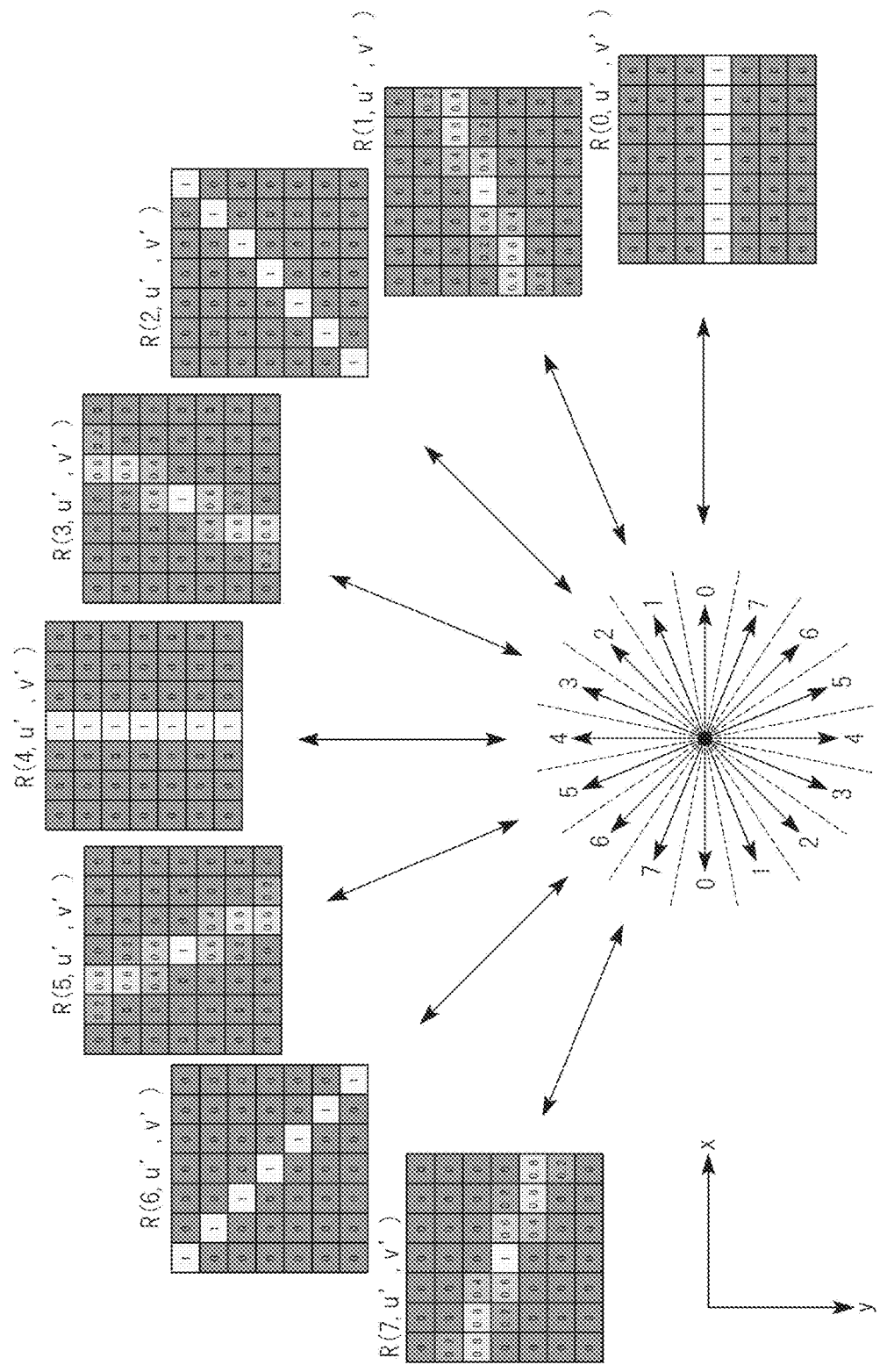
FIG. 11 is a conceptual diagram illustrating an exemplary reference region weighting.

FIG. 11 is a conceptual diagram illustrating an exemplary reference region weighting.

A relation between a horizontal axis and a vertical axis in FIG. 11 is the same as in FIGS. 9 and 10.

Arrows radially extending from one original point at the lower side than the center of FIG. 11 and numerical values shown at end points of the arrows indicate quantization contour directions, similarly to FIG. 9. Each of grid-like diagrams in directions in which arrows indicated by numerical values 0 to 7 counterclockwise from the right side of an original point move toward an upper half plane indicates the reference region weighting $R(D(i,j),u',v')$ corresponding to the quantization contour direction $D(i,j)$. FIG. 11 illustrates the reference region weightings $R(0,u',v')$ to $R(7,u',v')$ in the counterclockwise order from the right side. Small quadrangles included in each reference region weighting $R(D(i,j),u',v')$ indicate reference images. In FIG. 11, the number of reference images included in each reference region weighting $R(D(i,j),u',v')$ is 7 in the horizontal direction and 7 in the vertical direction. A numerical value shown in each quadrangle is a reference region weighting value. The reference region weighting value is 1 for the reference pixel in the quantization contour direction from the center (the pixel of interest) of the reference region, and has a value that increases as the direction of the reference pixel approximates more to the direction. For example, the reference region weighting $R(0,u',v')$ corresponding to the quantization contour direction 0 is 1 for all the reference pixels in a fourth row, and 0 for all the reference pixels in the other rows. The reference region weighting $R(6,u',v')$ corresponding to the quantization contour direction 6 is 1 for all the reference pixels in a first row of a first column to a seventh row of a seventh column and 0 for all the other reference pixels. The quantization contour direction is not necessarily the horizontal direction, the vertical direction, or a diagonal direction ($\pi/4$ or $3\pi/4$). When the quantization contour direction is any other direction, the reference region weighting $R(D(i,j),u',v')$ is decided to be proportional to a distance by which the line segment extending from the center of the reference region in the quantization contour direction passes through. For example, the reference region weighting $R(1, u',v')$ corresponding to the quantization contour direction 1 for a pixel in a seventh column from a leftmost column of a second row from a topmost row is 0.2. The reference region weightings $R(1,u',v')$ corresponding to the quantization contour direction 1 for pixels in fifth to seventh columns of a third row are 0.4, 0.8, and 0.8, respectively. The reference region weightings $R(1,u',v')$ corresponding to the quantization contour direction 1 for pixels in second to sixth columns of a fourth row are 0.2, 0.6, 1.0, 0.6, and 0.2, respectively. The reference region weighting R(1,u',v') corresponding to the quantization contour direction 1 for pixels in first to third columns of a fifth row are 0.8, 0.8, and 0.4, respectively. The reference region weighting R(1,u',v') corresponding to the quantization contour direction 1 for a pixel in a first column of a sixth row is 0.2. The reference region weightings R(1,u',v') corresponding to the quantization contour direction 1 for the other reference pixels are 0.

Figure 12:
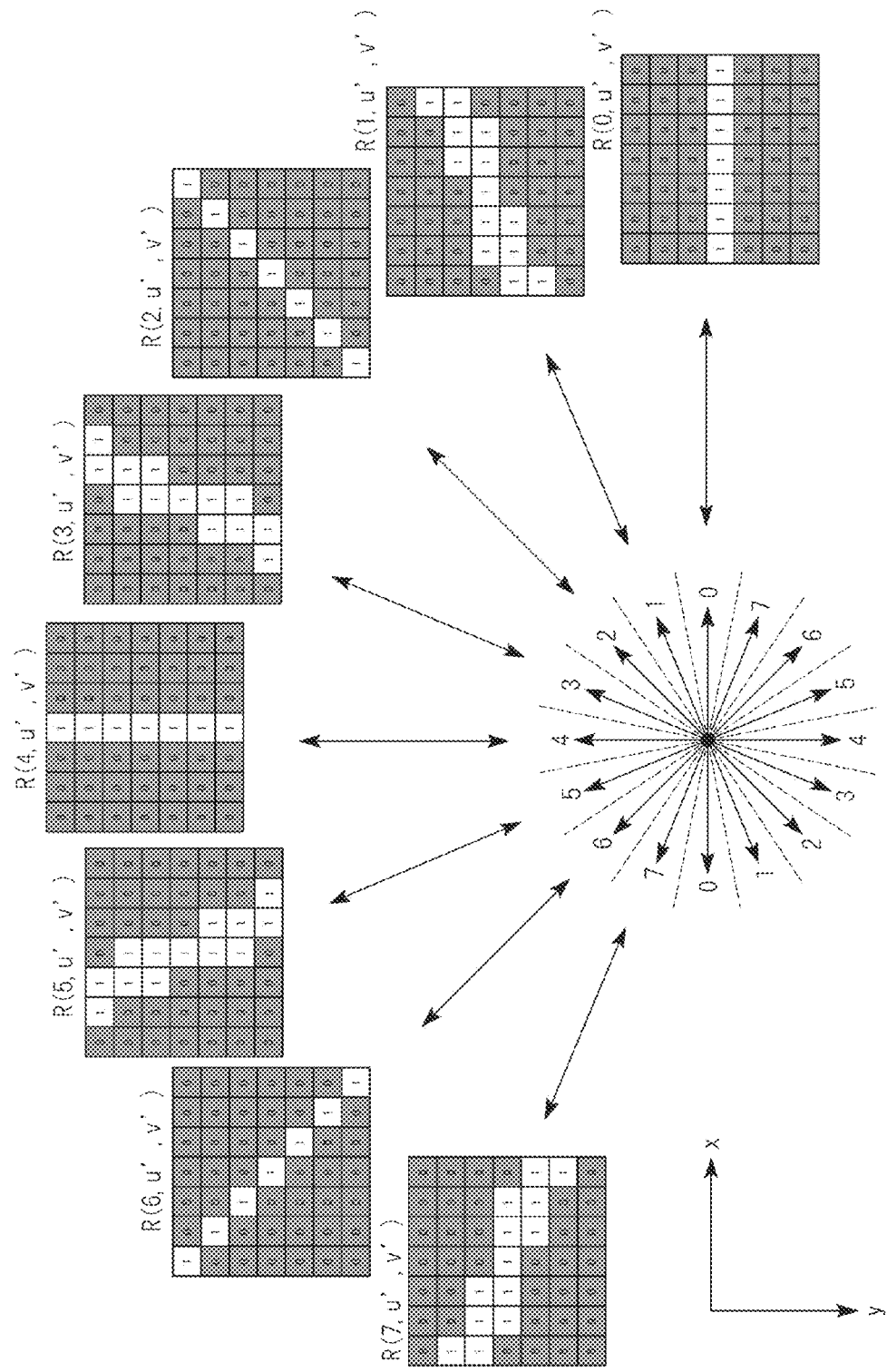
FIG. 12 is a conceptual diagram illustrating another exemplary reference region weighting.

FIG. 12 is a conceptual diagram illustrating another exemplary reference region weighting.

A relation between a horizontal axis and a vertical axis of and a relation between arrows indicating the quantization contour directions and grid-like diagrams corresponding to the quantization contour directions in FIG. 12 are the same as in FIG. 11. The quantization contour directions for the reference region weightings R(D(i,j),u',v') corresponding to the quantization contour directions 0, 2, 4, and 6 that are the horizontal direction, the vertical direction, and the diagonal direction ($\pi/4$ and $3\pi/4$) are the same as in the example illustrated in FIG. 11.

The reference region weightings R(D(i,j),u',v') for the other quantization contour directions are different from those of FIG. 11. In the example illustrated in FIG. 12, the reference region weightings R(D(i,j),u',v') for the reference pixels through which a line segment extending from the center of the reference region in the quantization contour direction passes are decided to be 1. The reference region weighting R(D(i,j),u',v') for the other reference pixels are decided to be 0. For example, the reference region weightings R(1,u',v') corresponding to the quantization contour direction 1 for pixels in a seventh column from a leftmost column in a second row from a topmost row, pixels in fifth to seventh columns of a third row, pixels in second to sixth columns of a fourth row, pixels in first to third columns of a fifth row, and pixels in a first column of a sixth row are 1. The reference region weightings R(1,u',v') corresponding to the quantization contour direction 1 for the other reference pixels are 0. In other words, in the example illustrated in FIG. 12, the reference region weighting R(D(i,j),u',v') indicates whether or not the reference pixel is selected according to whether or not the line segment extending from the center of the reference region in the quantization contour direction passes through.

(Exemplary Direction Evaluation Value Calculation)

Next, an exemplary direction evaluation value calculation will be described.

Figure 13:
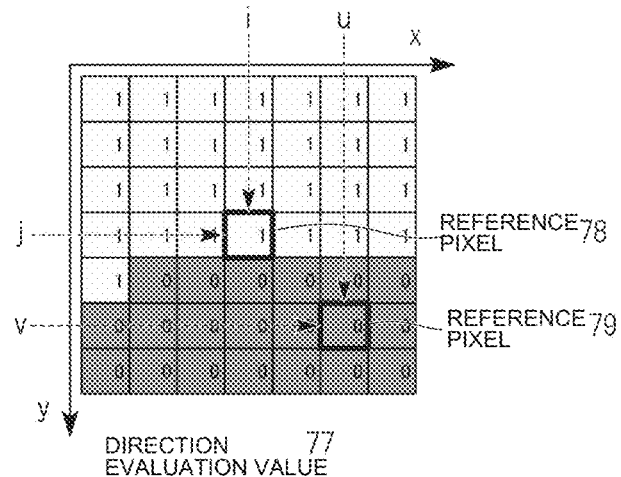
FIG. 13 is a conceptual diagram illustrating an exemplary direction evaluation value.

FIG. 13 is a conceptual diagram illustrating an exemplary direction evaluation value (a direction evaluation value 77).

A horizontal axis and a vertical axis of FIG. 13 are the same as in FIG. 4.

Small quadrangles included in the direction evaluation value 77 indicate reference pixels. A numerical value shown in each quadrangle indicates a value of the direction evaluation value F($\Delta$D) for the pixel of interest 63 (see FIG. 10). The direction evaluation value F($\Delta$D) is the direction evaluation value that is calculated based on D(i,j) for the pixel of interest 63 (see FIG. 10) and the quantization contour direction D(u,v) for each reference pixel (u,v) belonging to the reference region 73 (see FIG. 10) through the direction evaluating unit 22. In FIG. 13, the direction evaluation values F($\Delta$D) for the reference pixels in a topmost row to a fourth row are 1. The direction evaluation values F($\Delta$D) for the reference pixels in a fifth row to a seventh row excluding the reference pixels in a leftmost fifth row are 0. In other words, FIG. 13 illustrates that the quantization contour directions related to the reference pixels in the topmost row to the fourth row of the reference region 73 (see FIG. 10) are the same to the quantization contour directions related to the pixel of interest 63 (see FIG. 10). FIG. 13 illustrates that the quantization contour directions related to most of the reference pixels in the fifth to seventh rows of the reference region 73 (see FIG. 10) are different from the quantization contour directions related to the pixel of interest 63 (see FIG. 10).

Here, arrows that are indicated by i and j serving as a starting point and directed toward a reference pixel 78 indicate that the reference pixel 78 is a reference pixel corresponding to the pixel of interest 63 having the same index (i,j). It indicates that the direction evaluating unit 22 has decided "1" as the direction evaluation value F($\Delta$D) because the quantization contour direction D(i,j) of the pixel of interest 63 is the same as the quantization contour direction D(i,j) of the pixel of interest 63 serving as the reference pixel.

Arrows that are indicated by u and v serving as a starting point and directed toward a reference pixel 79 indicate that the reference pixel 79 is a reference pixel corresponding to the reference pixel 74 having the same index (u,v). It indicates that the direction evaluating unit 22 has decided "0" as the direction evaluation value F($\Delta$D) because the quantization contour direction D(i,j) of the pixel of interest 63 and the quantization contour direction D(i,j) of the reference pixel 74 are 5 and 4, respectively, and different from each other.

Figure 14:
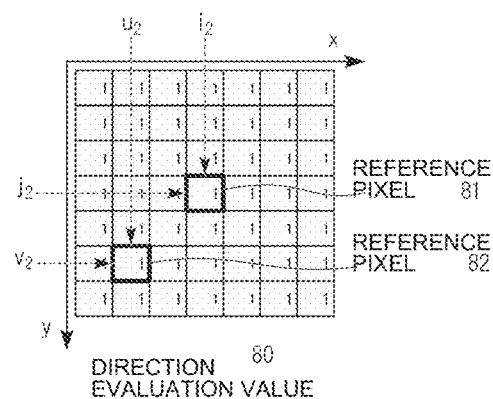
FIG. 14 is a conceptual diagram illustrating another exemplary direction evaluation value.

FIG. 14 is a conceptual diagram illustrating another exemplary direction evaluation value (a direction evaluation value 80).

A horizontal axis and a vertical axis of FIG. 14 are the same as in FIG. 4.

Small quadrangles included in the direction evaluation value 80 indicate reference pixels. A numerical value shown in each quadrangle indicates a value of the direction evaluation value F($\Delta$D) for the pixel of interest 72 (see FIG. 10). The direction evaluation value F($\Delta$D) is the direction evaluation value that is calculated based on D($i_2,j_2$) for the pixel of interest 72 (see FIG. 10) and the quantization contour direction D($u_2,v_2$) for each reference pixel ($u_2,v_2$) belonging to the reference region 75 (see FIG. 10) through the direction evaluating unit 22. In FIG. 14, the direction evaluation values F($\Delta$D) for all the reference pixels are 1. In other words, FIG. 14 illustrates that the quantization contour directions related to all the reference pixels belonging to the reference region 75 (see FIG. 10) are the same as the quantization contour directions related to the pixel of interest 72 (see FIG. 10).

Here, arrows that are indicated by $i_2$ and $j_2$ serving as a starting point and directed toward a reference pixel 81 indicate that the reference pixel 81 is a reference pixel corresponding to the pixel of interest 72 (see FIG. 10) having the same index ($i_2,j_2$). It indicates that the direction evaluating unit 22 has decided "1" as the direction evaluation value F($\Delta$D) because the quantization contour direction D($i_2,j_2$) of the pixel of interest 72 is the same as the quantization contour direction D($i_2,j_2$) of the pixel of interest 72 (see FIG. 10) serving as the reference pixel.

Arrows that are indicated by $u_2$ and $v_2$ serving as a starting point and directed toward a reference pixel 82 indicate that the reference pixel 82 is a reference pixel corresponding to the reference pixel 76 (see FIG. 10) having the same index ($u_2,v_2$). It indicates that the direction evaluating unit 22 has decided "1" as the direction evaluation value F($\Delta$D) because the quantization contour direction D($i_2,j_2$) of the pixel of interest 72 (see FIG. 10) and the quantization contour direction D(i$_2$,j$_2$) of the reference pixel 76 (see FIG. 10) are 2 and 2, respectively, and the same as each other.

(Exemplary Direction Evaluation Region Weighting Calculation)

Next, an exemplary direction evaluation region weighting calculation will be described.

Figure 15:
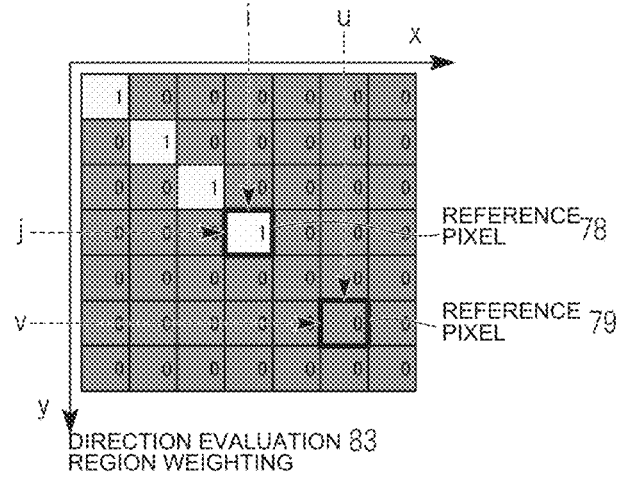
FIG. 15 is a conceptual diagram illustrating an exemplary direction evaluation region weighting.

FIG. 15 is a conceptual diagram illustrating an exemplary direction evaluation region (the direction evaluation region weighting 83).

A horizontal axis and a vertical axis of FIG. 15 are the same as in FIG. 4.

Small quadrangles included in the direction evaluation region weighting 83 indicate reference pixels. A numerical value shown in each quadrangle indicates a direction evaluation region weighting value corresponding to the reference pixel. The direction evaluation region weighting value is a value that is obtained by multiplying the reference region weighting R(6,u',v') (see FIG. 11) of each reference pixel for the pixel of interest 63 (see FIG. 10) by the direction evaluation value F(ΔD) of the corresponding reference pixel (see FIG. 13) through the product-sum operation unit 25. In FIG. 15, the direction evaluation region weighting values for a reference pixel in a topmost leftmost column to a reference pixel (the reference pixels 78) in a fourth column of a fourth row are 1. The direction evaluation region weighting values for the other reference pixels are 0.

Here, arrows that are indicated by i and j serving as a starting point and directed toward a reference pixel 78 indicate that the reference pixel 78 corresponds to the reference pixel 78 (see FIG. 13) having the same index (i,j). The reference pixel 78 corresponds to the pixel of interest 63 (see FIG. 10). In other words, it indicates that the direction evaluation region weighting value for the reference pixel 78 is calculated by multiplying the direction evaluation value F(ΔD) (see FIG. 13) for the reference pixel 78 by the reference region weighting R(6,0,0) (see FIG. 11) corresponding to the reference pixel. Arrows that are indicated by u and v serving as a starting point and directed toward a reference pixel 79 correspond to the reference pixel 79 having the same index (u,v). The reference pixel 79 corresponds to the reference pixel 74 (see FIG. 10). In other words, it indicates that the direction evaluation region weighting value for the reference pixel 79 is calculated by multiplying the direction evaluation value F(ΔD) (see FIG. 14) for the reference pixel 79 by the reference region weighting R(6,2,2) (see FIG. 11) corresponding to the reference pixel.

Figure 16:
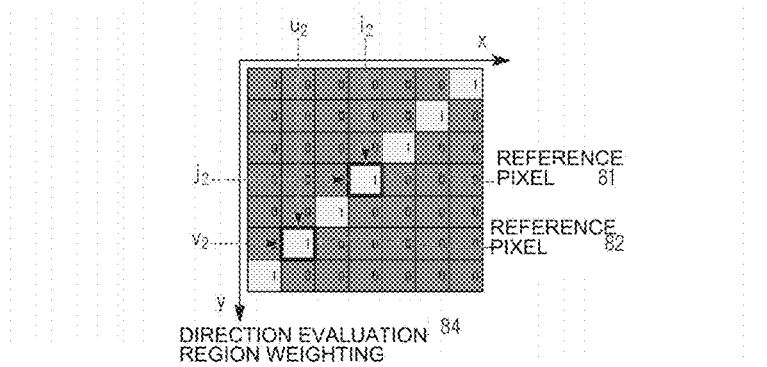
FIG. 16 is a conceptual diagram illustrating another exemplary direction evaluation region weighting.

FIG. 16 is a conceptual diagram illustrating another exemplary direction evaluation region weighting (a direction evaluation region weighting 84).

A horizontal axis and a vertical axis of FIG. 16 are the same as in FIG. 4.

Small quadrangles included in the direction evaluation region weighting 84 indicate reference pixels. A numerical value shown in each quadrangle indicates a direction evaluation region weighting value corresponding to the reference pixel. The direction evaluation region weighting value is a value that is obtained by multiplying the reference region weighting R(2,u',v') (see FIG. 11) of each reference pixel for the pixel of interest 72 (see FIG. 10) by the direction evaluation value F(ΔD) of the corresponding reference pixel (see FIG. 14) through the product-sum operation unit 25. In FIG. 16, the direction evaluation region weighting values for all the reference pixels on a diagonal line from a leftmost column of a lowest row to a rightmost column of a topmost row are 1. The direction evaluation region weighting values for the other reference pixels are 0.

Here, arrows that are indicated by i$_2$ and j$_2$ serving as a starting point and directed toward the reference pixel 81 indicate that the reference pixel 81 corresponds to the reference pixel 81 (see FIG. 14) having the same index (i$_2$,j$_2$). The reference pixel 81 corresponds to the pixel of interest 72 (see FIG. 10). In other words, it indicates that the direction evaluation region weighting value for the reference pixel 81 is calculated by multiplying the direction evaluation value F(ΔD) (see FIG. 14) for the reference pixel 81 by the reference region weighting R(2,0,0) (see FIG. 11) corresponding to the reference pixel. Arrows that are indicated by u$_2$ and v$_2$ serving as a starting point and directed toward the reference pixel 79 correspond to a reference pixel 82 having the same index (u$_2$,v$_2$). The reference pixel 76 (see FIG. 10) corresponds to the reference pixel 82 (see FIG. 10). In other words, it indicates that the direction evaluation region weighting value for the reference pixel 82 is calculated by multiplying the direction evaluation value F(ΔD) (see FIG. 14) for the reference pixel 82 by the reference region weighting R(2,−2,2) (see FIG. 11) corresponding to the reference pixel.

Next, a pixel (i,j) related to the signal value Y(i,j) that is multiplied by the direction evaluation region weighting value having a value (for example, 1) other than 0 in the product-sum operation unit 25 will be described. Hereinafter, this pixel is referred to as a smoothing target pixel.

Figure 17:
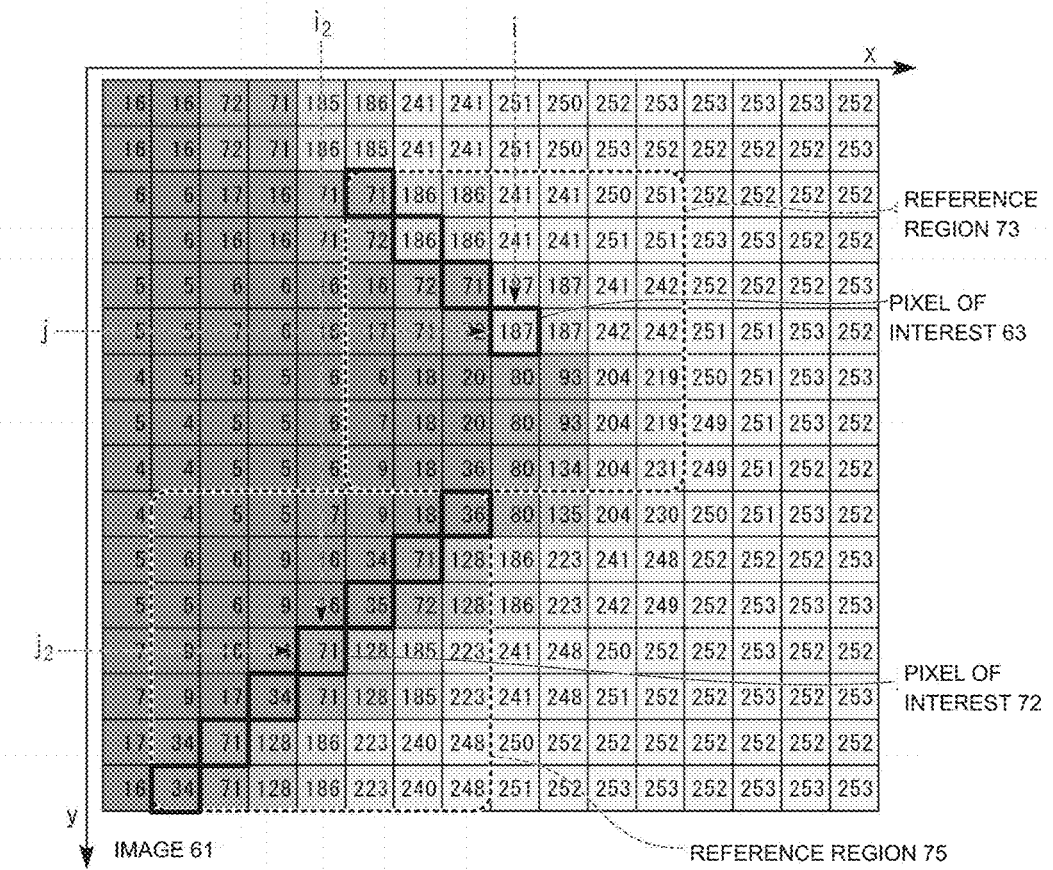
FIG. 17 is a conceptual diagram illustrating an exemplary smoothing target pixel.

FIG. 17 is a conceptual diagram illustrating an exemplary smoothing target pixel.

A relation between a horizontal axis and a vertical axis of FIG. 17 is the same as in FIG. 4. An image 61 is the same as the image 61 illustrated in FIG. 4. In FIG. 17, a positional relation between pixels of interest 63 and 72 and reference regions 73 and 75 is the same as the positional relation in FIG. 10. In other words, the direction evaluation region weightings related to the reference regions 73 and 75 are the same as the direction evaluation region weighting 83 (see FIG. 15) and the direction evaluation region weighting 84 (see FIG. 16), respectively. The direction evaluation region weightings 83 and 85 are used when the product-sum operation unit 25 calculates the product-sum value S(i,j), the weighting area C(i,j), and the reference area N(i,j) corresponding to the pixels of interest 63 and 72.

Small quadrangles drawn by thick lines in the reference regions 73 and 75 indicate smoothing target pixels. The smoothing target pixels included in the reference region 73 are reference pixels in a topmost leftmost column to a fourth column of a fourth row. The smoothing target pixels included in the reference region 75 are all reference pixels on a diagonal line from a leftmost column of a lowest row to a rightmost column of a topmost row. Thus, the signal values Y(i,j) related to the reference pixels are actually used to calculate the direction smoothing values Y'(i,j) related to the pixel of interests 63 and 72. On the other hand, in the reference region 73, the reference pixels in a fifth column of a fifth row to a lowest column of a topmost row are not actually used to calculate the direction smoothing value Y'(i,j).

Thus, in the present embodiment, the contour direction of each pixel is calculated, and the pixel of interest is smoothed using the signal value related to the reference pixel that is in the quantization contour direction of the pixel of interest or in the direction approximating to the quantization contour direction and has the contour direction that is the same as or approximates to the contour direction of the pixel of interest. Thus, it is possible to visually reduce noise while carefully considering a reference pixel serving as an actual smoothing target even at a corner point serving as a pixel that is different in the contour direction from a neighboring or adjacent pixel.

Figure 18:
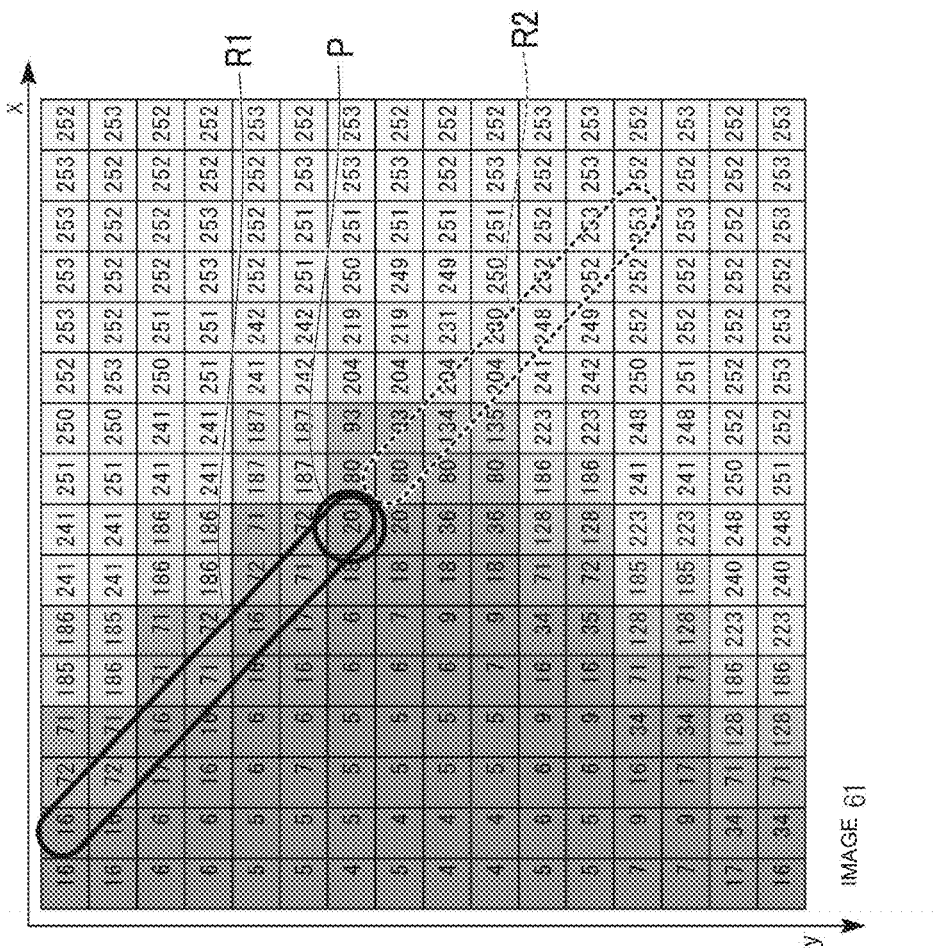
FIG. 18 is a conceptual diagram illustrating an exemplary processing target image.

FIG. 18 is a conceptual diagram illustrating an exemplary processing target image (an image 61).

A relation between a horizontal axis and a vertical axis of FIG. 18 is the same as in FIG. 4. An image 61 is the same as the images 61 illustrated in FIGS. 4 and 17 and an exemplary image in which noise is easily noticeable.

In FIG. 18, P indicates a corner point. R1 indicates a region occupied by pixels having the same contour direction as the corner point P in the contour direction of the corner point P. Q indicates the contour direction of the corner point P, and D indicates a normal line direction of the contour of the corner point P.

R2 indicates a region occupied by pixels having a contour direction different from the corner point P in the contour direction of the corner point P. In the present embodiment, when the direction smoothing value Y'(i,j) is calculated using the corner point P as the pixel of interest, the signal value Y(i,j) related to the reference pixel included in R1 is considered, and the signal value Y(i,j) related to the reference pixel included in R2 is not considered.

The reason why the direction smoothing value Y'(i,j) is calculated in view of the signal value Y(i,j) related to the reference pixel included in R1, and noise is visually reduced is to reduce a change in the signal value Y(i,j) in the contour direction. It is because the change in the signal value Y(i,j) is sensitively recognized as noise by human vision. On the other hand, when the change in the signal value Y(i,j) in the contour direction is small, noise is relatively hard to be recognized.

Figure 19:
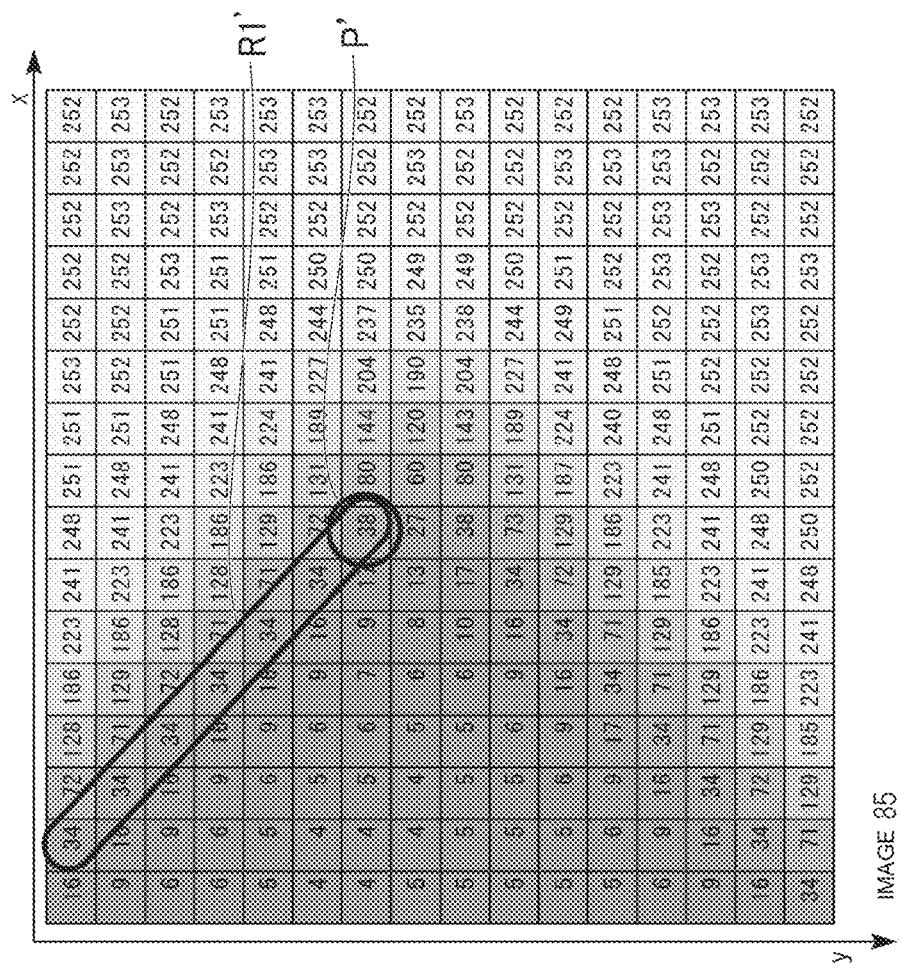
FIG. 19 is a conceptual diagram illustrating another exemplary processing target image.

FIG. 19 is a conceptual diagram illustrating another exemplary processing target image (an image 85).

The image 85 is an exemplary image in which noise is relatively hard to be recognized. In FIG. 19, a relation between a horizontal axis and a vertical axis is the same as in FIG. 18. A pixel P' is a pixel at the same coordinates as the corner point P (FIG. 18). A region R1' indicates the same region (FIG. 18) as R1.

Here, the signal values Y(i,j) of the pixels belonging to the regions R1 and R1' are compared.

Figure 20:
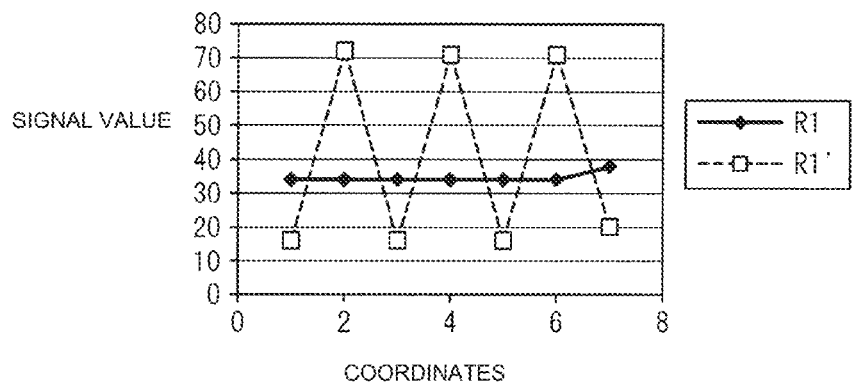
FIG. 20 is a diagram illustrating signal values of pixels belonging to respective contour regions.

FIG. 20 is a diagram illustrating the signal values Y(i,j) of the pixels belonging to the respective contour regions.

A horizontal axis indicates indices of pixels in the Q direction (see FIGS. 19 and 20) based on one ends of the regions R1 and R1'. A vertical axis indicates a signal value. Rhombic plots indicate the signal values of the pixels included in the region R1. Quadrangular plots indicate the signal values of the pixels included in the region R2. According to FIG. 20, the signal values of the pixels in the region R1 change between 16 to 72. The signal values of the pixels in the region R2 change between 34 to 38. The fact that the change in the signal value in the region R1 is much larger than the change in the region R2 supports the cause of noise that is sensitively recognized in the region R1.

Next, image processing according to the present embodiment will be described.

Figure 21:
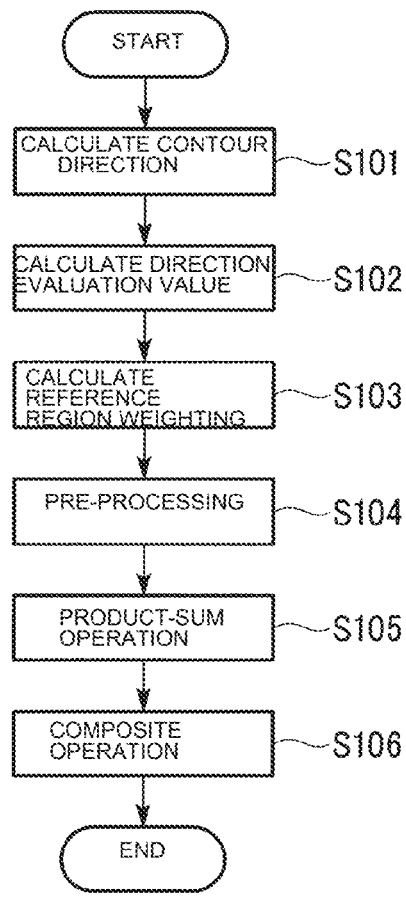
FIG. 21 is a flowchart illustrating image processing according to the present embodiment.

FIG. 21 is a flowchart illustrating image processing according to the present embodiment.

(Step S101) The contour direction estimating unit 21 calculates the contour direction of each pixel based on the signal value of each pixel indicated by the brightness signal Y input from the scaling unit 13. The contour direction estimating unit 21 quantizes the contour direction of each calculated pixel, and calculates the quantization contour direction. The contour direction estimating unit 21 outputs the quantization contour direction information indicating the calculated quantization contour direction to the direction evaluating unit 22 and the reference region weighting processing unit 23. Thereafter, the process proceeds to step S102.

(Step S102) The direction evaluating unit 22 calculates the direction evaluation value of each reference pixel belonging to the reference region centering on the pixel of interest for each pixel of interest based on the quantization contour direction of each pixel indicated by the quantization contour direction information input from the contour direction estimating unit 21. For example, the direction evaluating unit 22 calculates the direction evaluation value such that the reference pixel having the quantization contour direction that is the same or approximates to the quantization contour direction of the pixel of interest has a large direction evaluation value. The direction evaluating unit 22 outputs the direction evaluation value information indicating the direction evaluation value of each reference pixel for each pixel of interest to the product-sum operation unit 25. Thereafter, the process proceeds to step S103.

(Step S103) The reference region weighting processing unit 23 decides the reference region weighting information for each the pixel of interest based on the quantization contour direction information input from the contour direction estimating unit 21 (reference region weighting calculation). The reference region weighting processing unit 23 reads the reference region weighting information corresponding to the quantization contour direction of each pixel of interest from the storage unit. The reference region weighting information indicates a weighting coefficient that increases as the reference pixel is in the quantization contour direction of the pixel of interest or the direction approximating to the quantization contour direction. The reference region weighting processing unit 23 outputs the read reference region weighting information to the product-sum operation unit 25. Thereafter, the process proceeds to step S104.

(Step S104) The pre-processing unit 24 extracts the brightness signal indicating the signal value Y(u,v) of each reference pixel (u,v) belonging to the reference region centering on the pixel of interest (i,j) from the brightness signal Y input from the scaling unit 13 for each pixel of interest (i,j) (pre-processing). The pre-processing unit 24 outputs the brightness signal Y extracted for each pixel of interest (i,j) to the product-sum operation unit 25. Thereafter, the process proceeds to step S105.

(Step S105) The product-sum operation unit 25 receives the direction evaluation value information, the reference region weighting information, and the brightness signal from the direction evaluating unit 22, the reference region weighting processing unit 23, and the pre-processing unit 24, respectively, for each pixel of interest. The product-sum operation unit 25 calculates a product-sum value, for example, using Formula (5) based on the direction evaluation value indicated by the direction evaluation value information, the reference region weighting indicated by the reference region weighting information, and the signal value indicated by the brightness signal (product-sum operation). The product-sum operation unit 25 calculates the weighting area, for example, using Formula (6) based on the direction evaluation value indicated by the direction evaluation value information, and the reference region weighting indicated by the reference region weighting information. The product-sum operation unit 25 calculates the sum of the reference region weightings indicated by the reference region weighting information for the reference pixels belonging to the reference region as the reference area. The product-sum operation unit 25 generates the product-sum value information, the weighting area information, and the reference area information respectively indicated by the product-sum value, the weighting area, and the reference area, and outputs the generated product-sum value information, the weighting area information, and the reference area information to the composition operation unit 26. Thereafter, the process proceeds to step S106.

(Step S106) The composition operation unit 26 receives the product-sum value information, the weighting area information, and the reference area information from the product-sum operation unit 25, and receives the brightness signal from the scaling unit 13. The composition operation unit 26 calculates the direction smoothing value by dividing the product-sum value indicated by the product-sum value information by the weighting area C indicated by the weighting area information. The composition operation unit 26 calculates the mixing ratio by dividing the weighting area by the reference area indicated by the reference area information. The composition operation unit 26 performs a composition operation by weighting and adding the direction smoothing value and the signal value indicated by the brightness signal based on the mixing ratio, and calculates a composition signal value. The composition operation unit 26 outputs the brightness signal indicated by the calculated composition signal value to the image format converting unit 14. Thereafter, the process ends.

As described above, in the present embodiment, the contour direction is estimated for each pixel of interest based on the signal value of each pixel, and the evaluation value of each reference pixel is decided based on the estimated contour direction of each pixel of interest and the contour direction of each reference pixel in the predetermined reference region from each pixel of interest. Further, in the present embodiment, the weighting coefficient of each reference pixel in the reference region is decided based on the estimated contour direction of each pixel of interest and the direction of the reference pixel from each pixel of interest, and the value obtained by performing the product-sum operation based on the signal value of each reference pixel is synthesized with the signal value of each pixel of interest suing the decided evaluation value and the weighting coefficient.

Thus, the signal value of the pixel of interest is smoothed by the product-sum operation of the signal values of the reference pixels in which the relation between the contour direction of the pixel of interest and the direction of the reference pixel from the pixel of interest and the relation between the contour direction of the pixel of interest and the contour direction of the reference pixel are considered. As a result, it is possible to remove or reduce the noise in the visually sensitive contour direction with a relatively small computation amount.

(First Modified Example)

Next, in a first modified example of the present embodiment, the same components and processes as in the above embodiment are denoted by the same reference numerals, and the description proceeds. The display device 1 (see FIG. 1) according to the present modified example includes an image processing unit 30 instead of the image processing unit 20.

Figure 22:
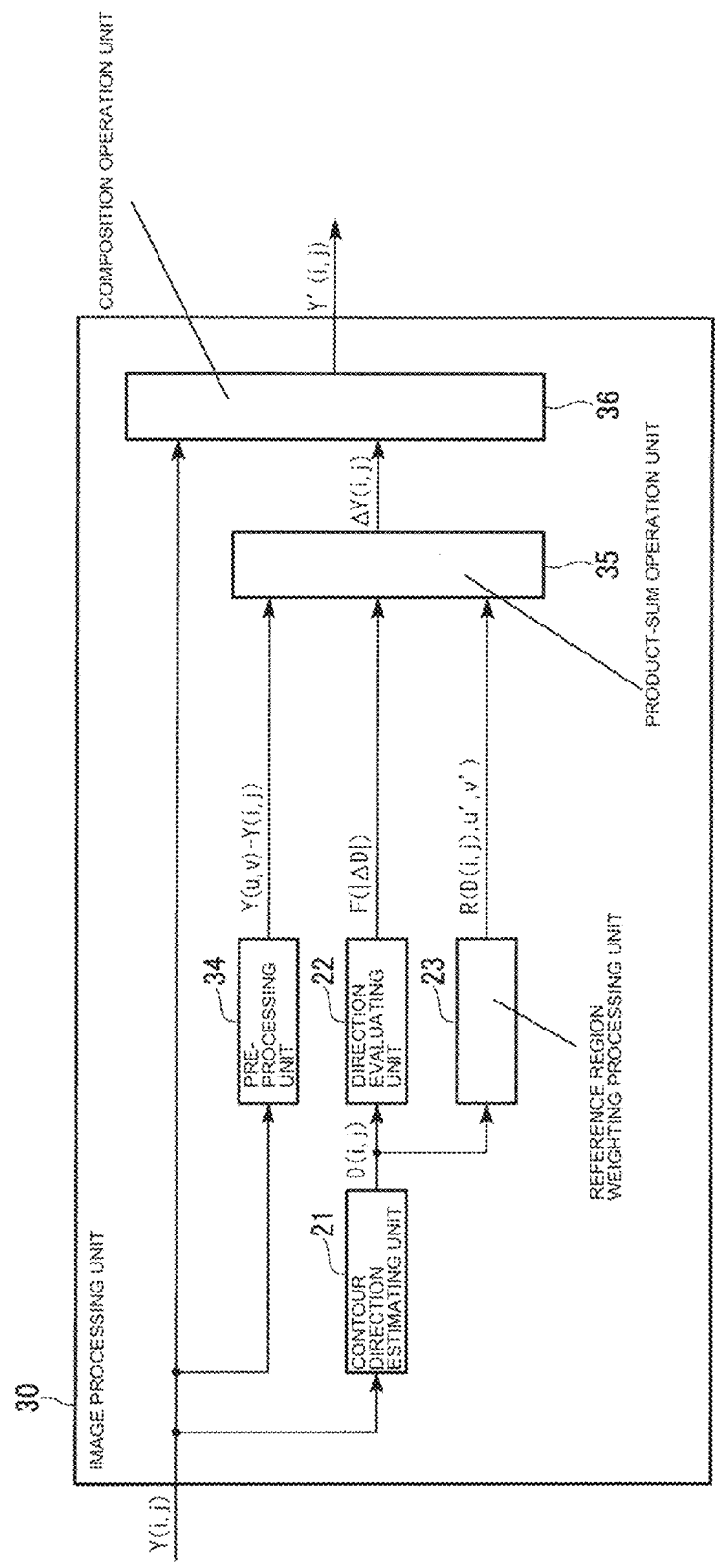
FIG. 22 is a schematic diagram illustrating a configuration of an image processing unit according to a modified example of the present embodiment.

FIG. 22 is a schematic diagram illustrating a configuration of the image processing unit 30 according to the present modified example.

The image processing unit 30 is configured to include a contour direction estimating unit 21, a direction evaluating unit 22, a reference region weighting processing unit 23, a pre-processing unit 34, a product-sum operation unit 35, and a composition operation unit 36. In other words, the image processing unit 30 includes the pre-processing unit 34, the product-sum operation unit 35, and the composition operation unit 36 instead of the pre-processing unit 24, the product-sum operation unit 25, and the composition operation unit 26 in the image processing unit 20.

The pre-processing unit 34 extracts the brightness signal indicating the signal value Y(u,v) of each reference pixel (u,v) belonging to the reference region centering on the pixel of interest (i,j) from the brightness signal Y input from the scaling unit 13 for each pixel of interest (i,j). The pre-processing unit 34 subtracts the signal value Y(i,j) of the pixel of interest from the signal value Y(u,v) of the reference signal indicated by the extracted brightness signal, and calculates the differential signal value Y(u,v)−Y(i,j). The pre-processing unit 34 generates a differential signal indicating the calculated differential signal value, and outputs the generated differential signal to the product-sum operation unit 35.

The product-sum operation unit 35 receives the direction evaluation value information, the reference region weighting information, and the differential signal from the direction evaluating unit 22, the reference region weighting processing unit 23, and the pre-processing unit 34, respectively, for each pixel of interest (i,j).

The product-sum operation unit 35 calculates a smoothing differential value ΔY(i,j) by performing the product-sum operation on the differential signal value Y(u,v)−Y(i,j) indicated by the differential signal, the direction evaluation value F(|ΔD|) indicated by the direction evaluation value information, and the reference region weighting R(D(i,j),u', v') indicated by the reference region weighting information.

The product-sum operation unit 35 uses, for example, Formula (8) to calculate the smoothing differential value ΔY(i,j).

[Mathematical Formula 8]

$$\Delta Y(i, j) = \frac{1}{N(i, j)} \left( \sum_{u', v'} F(|\Delta D|) R(D(i, j), u', v')(Y(u, v) - Y(i, j)) \right) \quad (8)$$

Formula (8) represents that the product of the direction evaluation value F(|ΔD|), the reference region weighting R(D(i,j),u',v'), and the differential signal value Y(u,v)−Y(i,j) indicated by the differential value is calculated for each reference pixel, and the sum of the calculated products for the reference pixels belonging to the reference region is calculated. Formula (8) represents that the smoothing differential value ΔY(i,j) is calculated by dividing the calculated sum by the reference area N(i,j). The product-sum operation unit 35 generates a smoothing differential signal indicating the calculated smoothing differential value ΔY(i, j), and outputs the generated smoothing differential signal to the composition operation unit 36.

The composition operation unit 36 receives the smoothing differential signal and the brightness signal Y from the product-sum operation unit 35 and the scaling unit 13, respectively. The composition operation unit 36 calculates the composite signal value Y"(i,j) by adding the smoothing differential value ΔY(i,j) indicated by the smoothing differential signal and the signal value Y(i,j) indicated by the brightness signal Y for each pixel of interest (i,j) (a composition operation). The composite signal value Y"(i,j)

becomes the same value as the composite signal value Y"(i,j) calculated using Formula (7).

The composition operation unit 36 generates the brightness signal Y" indicating the calculated composite signal value Y"(i,j). The composition operation unit 36 updates the brightness signal Y input from the scaling unit 13 to the brightness signal Y", and synchronizes the brightness signal Y" with the color-difference signals Cb and Cr. The composition operation unit 36 outputs the image signal including the brightness signal Y" and the color-difference signals Cb and Cr to the image format converting unit 14.

Next, image processing according to the present modified example will be described.

Figure 23:
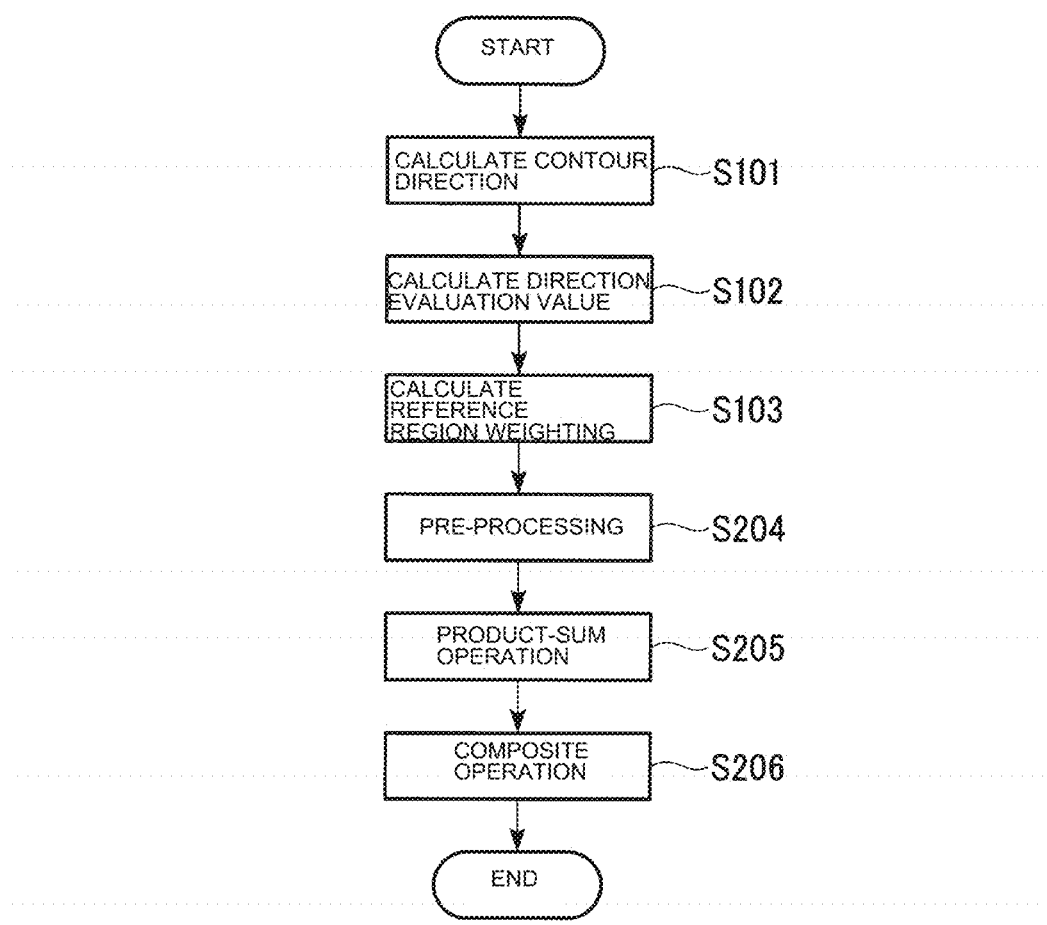
FIG. 23 is a flowchart illustrating image processing according to the present modified example.

FIG. 23 is a flowchart illustrating image processing according to the present modified example.

The image processing according to the present modified example includes steps S204 to S206 instead of steps S104 to S106 in image processing illustrated in FIG. 21. Step S204 is performed after step S103.

(Step S204) The pre-processing unit 34 extracts the brightness signal indicating the signal value Y(u,v) of each reference pixel (u,v) belonging to the reference region centering on the pixel of interest (i,j) from the brightness signal Y input from the scaling unit 13 for each pixel of interest (i,j). The pre-processing unit 34 calculates the differential signal value Y(u,v)−Y(i,j) based on the extracted brightness signal (pre-processing). The pre-processing unit 34 outputs the differential value indicating the calculated differential signal value to the product-sum operation unit 35.

Thereafter, the process proceeds to step S205.

(Step S205) The product-sum operation unit 35 receives the direction evaluation value information, the reference region weighting information, and the differential signal from the direction evaluating unit 22, the reference region weighting processing unit 23, and the pre-processing unit 34, respectively, for each pixel of interest (i,j). The product-sum operation unit 35 calculates the smoothing differential signal ΔY(i,j), for example, using Formula (8) based on the differential signal value Y(u,v)−Y(i,j) indicated by the differential value, the direction evaluation value F(|ΔD|) indicated by the direction evaluation value information, and the reference region weighting R(D(i,j),u',v') indicated by the reference region weighting information. The product-sum operation unit 35 outputs the smoothing differential signal indicating the calculated smoothing differential value ΔY(i, j) to the composition operation unit 36. Thereafter, the process proceeds to step S206.

(Step S206) The composition operation unit 36 calculates the composite signal value Y"(i,j) by adding the smoothing differential value ΔY(i,j) indicated by the smoothing differential signal input from the product-sum operation unit 35 and the signal value Y(i,j) indicated by the brightness signal Y input from the scaling unit 13. The composition operation unit 36 outputs the brightness signal indicating the calculated composite signal value Y"(i,j) to the image format converting unit 14. Thereafter, the process ends.

As described above, in the present modified example, the composition signal value of each pixel is calculated using the value obtained by performing the product-sum operation on the differential value between the signal value of each reference pixel corresponding to the pixel of interest and the signal value of the pixel of interest. As a result, it is possible to reduce a processing amount related to an operation without undermining the effect of removing or reducing the noise of the visually sensitive contour direction with the relative small computation amount.

(Second Modified Example)

Next, in a second modified example of the present embodiment, the same components and processes as in the above embodiment are denoted by the same reference numerals, and the description proceeds. The display device 1 (see FIG. 1) according to the present modified example includes an image processing unit 40 instead of the image processing unit 20.

Figure 24:
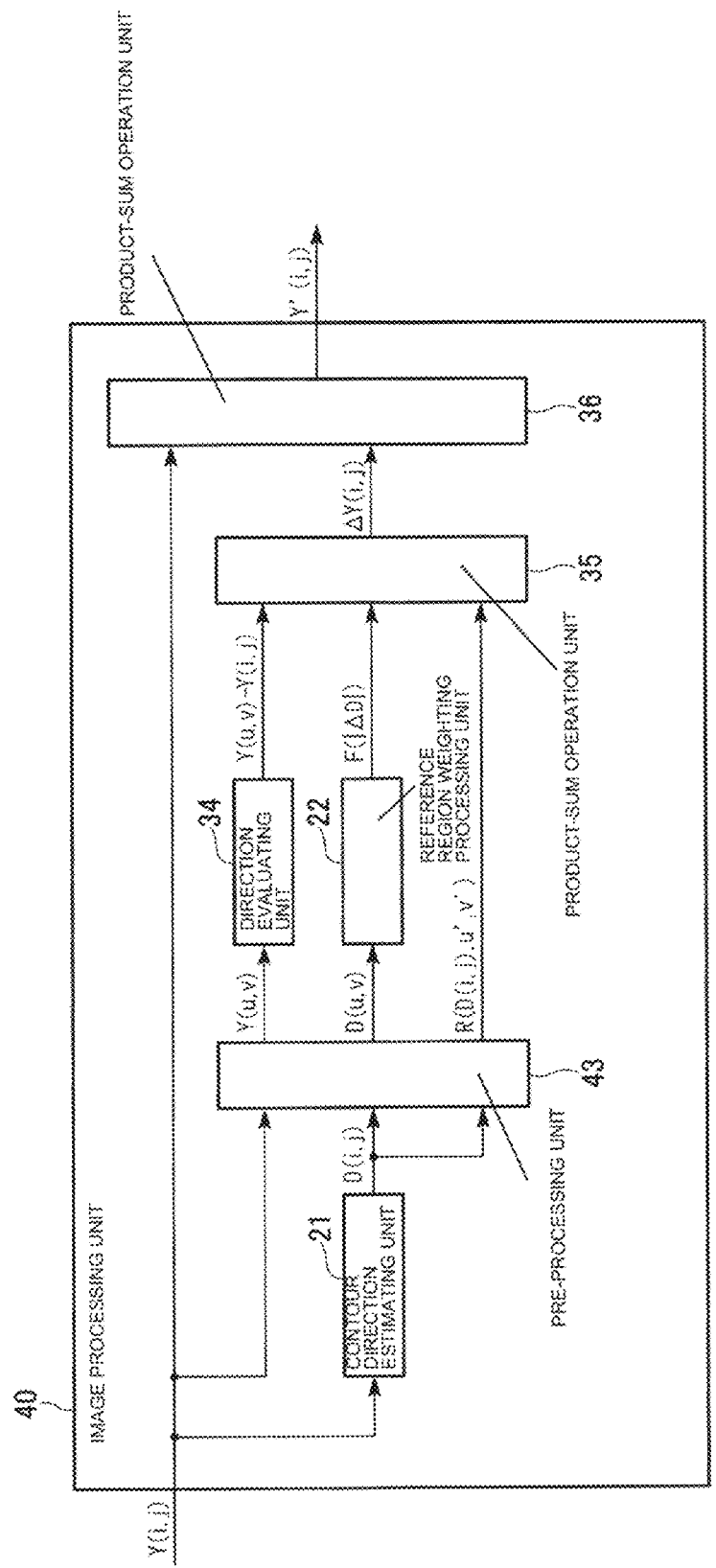
FIG. 24 is a schematic diagram illustrating a configuration of an image processing unit according to another modified example of the present embodiment.

FIG. 24 is a schematic diagram illustrating a configuration of the image processing unit 40 according to the present modified example.

The image processing unit 40 is configured to include a contour direction estimating unit 21, a direction evaluating unit 22, a reference region weighting processing unit 43, a pre-processing unit 34, a product-sum operation unit 35, and a composition operation unit 36. In other words, the image processing unit 40 includes the reference region weighting processing unit 43 instead of the reference region weighting processing unit 23 (see FIG. 2) in the image processing unit 30.

The reference region weighting processing unit 43 decides the weighting coefficient R(D(i,j),u',v') based on the quantization contour direction D(i,j) of each pixel indicated by the quantization contour direction information input from the contour direction estimating unit 21, similarly to the reference region weighting processing unit 23 (see FIG. 2). The reference region weighting processing unit 43 selects the weighting coefficient R(D(i,j),u',v') of each reference pixel (u',v') in which (D(i,j),u',v') has a non-zero value among the weighting coefficients R(D(i,j),u',v'). The reference pixel is positioned in the contour direction or in the direction approximating to the contour direction from the pixel of interest (i,j) and thus referred to as a contour direction reference pixel. The reference region weighting processing unit 43 generates the reference region weighting information indicating the weighting coefficient R(D(i,j),u', v') related to each contour direction reference pixel, and outputs the generated reference region weighting information to the product-sum operation unit 35.

The reference region weighting processing unit 43 extracts the quantization contour direction information indicating the quantization contour direction D(u,v) related to each contour direction reference pixel from the input quantization contour direction information. The reference region weighting processing unit 43 outputs the extracted quantization contour direction information to the direction evaluating unit 22.

The reference region weighting processing unit 43 extracts the brightness signal indicating the signal value Y(u,v) related to each contour direction reference pixel from the brightness signal input from the scaling unit 13. The reference region weighting processing unit 43 outputs the extracted brightness signal to the pre-processing unit 34.

The pre-processing unit 34, the direction evaluating unit 22, and the product-sum operation unit 35 perform the product-sum operation on the direction evaluation value F(|ΔD|), the weighting coefficient R(D(i,j),u',v'), and the differential value Y(u,v)−Y(i,j) to calculate the smoothing differential value ΔY(i,j) for each contour direction reference pixel. Here, the product-sum operation unit 35 uses Formula (9) instead of Formula (8).

[Mathematical Formula 9]

$$\Delta Y(i, j) = \frac{1}{N(i, j)} \left( \sum_{u', v' \in Rs(D(i,j))} F(|\Delta D|) R(D(i, j), u', v')(Y(u, v) - Y(i, j)) \right) \quad (9)$$

In Formula (9), $R_s(D(i,j))$ indicates a function (a region selection function) of selecting the contour direction reference pixel among the reference pixels related to the pixel of interest $(i,j)$. In other words, $u',v' \in Rs(D(i,j))$ indicates the contour direction reference pixel. Thus, the product-sum operation unit 35 can calculate the smoothing differential value $\Delta Y(i,j)$ equal to the smoothing differential value $\Delta Y(i,j)$ calculated when Formula (8) is used.

As described above, the reference region weighting processing unit 43 extracts the signal value or the coefficient related to each contour direction reference pixel and thus can reduce a computation amount in the pre-processing unit 34, the direction evaluating unit 22, and the product-sum operation unit 35 while obtaining the same operation result as in the first modified example.

Next, the image processing according to the present modified example will be described.

Figure 25:
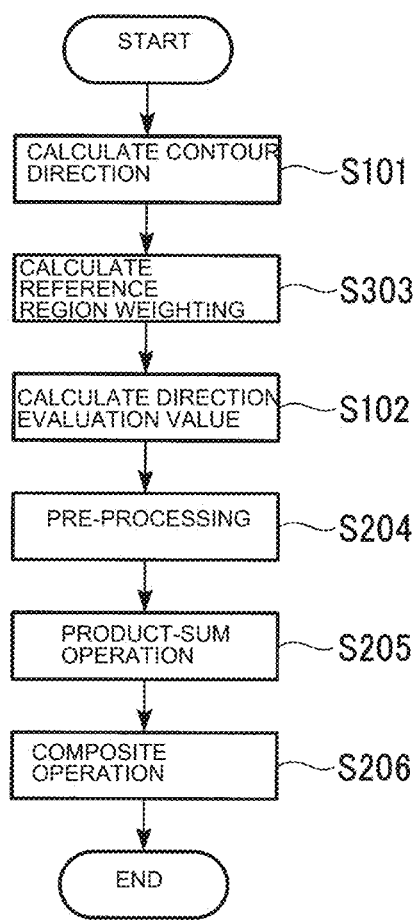
FIG. 25 is a flowchart illustrating image processing according to the present modified example.

FIG. 25 is a flowchart illustrating the image processing according to the present modified example.

The image processing according to the present modified example includes step S303 instead of step S103 in image processing illustrated in FIG. 23. Step S303 is performed after step S101. Step S204 is performed after step S102. Steps S204 to S206 are performed on each contour direction reference pixel instead of each reference pixel of each pixel of interest.

(Step S303) The reference region weighting processing unit 43 decides the weighting coefficient $R(D(i,j),u',v')$ for each pixel based on the quantization contour direction information input from the contour direction estimating unit 21. The reference region weighting processing unit 43 selects a weighting coefficient $R(D(i,j),u',v')$ having a non-zero value among the decided weighting coefficients $R(D(i,j),u',v')$ as the weighting coefficient $R(D(i,j),u',v')$ of each contour direction reference pixel. The reference region weighting processing unit 43 outputs the reference region weighting information indicating the selected weighting coefficient $R(D(i,j),u',v')$ to the product-sum operation unit 35. The reference region weighting processing unit 43 extracts the quantization contour direction information indicating the quantization contour direction $D(u,v)$ related to each contour direction reference pixel from the input quantization contour direction information, and outputs the extracted quantization contour direction information to the direction evaluating unit 22. The reference region weighting processing unit 43 extracts the brightness signal indicating the signal value $Y(u,v)$ related to each contour direction reference pixel from the brightness signal input from the scaling unit 13, and outputs the extracted brightness signal to the pre-processing unit 34.

As described above, in the present modified example, the weighting coefficient, the evaluation value, and the signal value of each reference pixel that is in the direction of the predetermined range from the contour direction of each image are extracted, and the product-sum operation is performed using the extracted weighting coefficient, the evaluation value, and the signal value of each reference pixel. Thus, the weighting coefficient, the evaluation value, and the signal value that do not contribute to the operation result are excluded. Thus, it is possible to reduce a processing amount related to an operation and the storage capacity of the storage unit without undermining the effect of removing or reducing the noise of the visually sensitive contour direction with the relative small computation amount.

(Exemplary Processing)

Next, an exemplary image generated by performing processing according to the present embodiment will be described.

Figure 26:
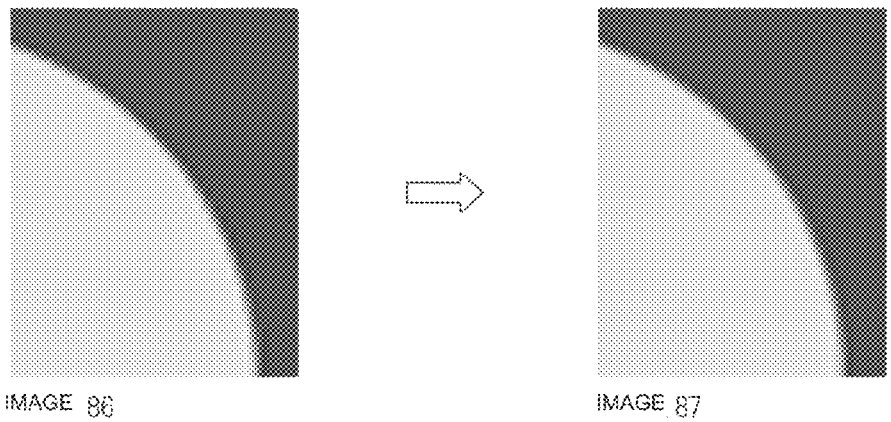
FIG. 26 illustrates exemplary images related to brightness signals before and after processing according to the present embodiment is performed.

FIG. 26 illustrates exemplary images (images 86 and 87) related to brightness signals before and after processing according to the present embodiment is performed.

The image 86 is an image indicated by a brightness signal obtained by scaling a brightness signal related to a low resolution image with a triple enlargement factor. Step-like noise (jaggy) occurs in the boundary between a bright region and a dark region of the image 86. The image 87 is an image indicated by a brightness signal obtained by performing the processing according to the present modified example on the brightness signal related to the image 86. In the image 87, the boundary between the bright region and the dark region is smooth, and the step-like noise is removed.

Figure 27:
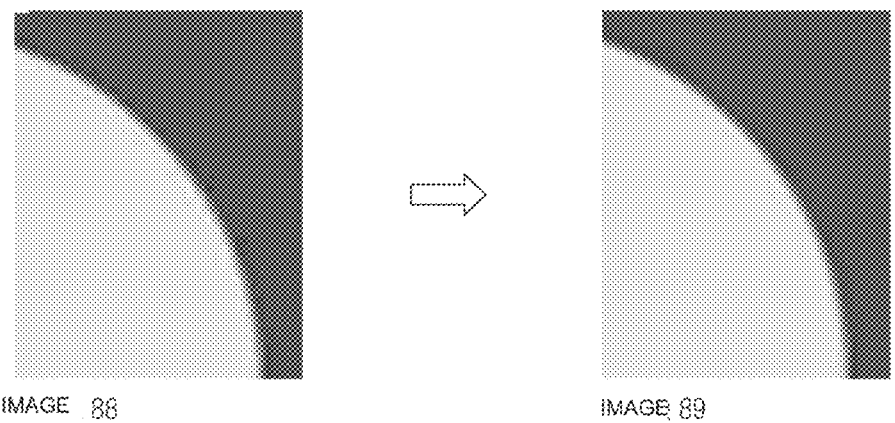
FIG. 27 illustrates other exemplary images related to brightness signals before and after processing according to the present embodiment is performed.

FIG. 27 illustrates other exemplary images (images 88 and 89) related to brightness signals before and after the processing according to the present embodiment is performed.

The image 88 is an image indicated by a brightness signal obtained by scaling a brightness signal related to a compressed image with a triple enlargement factor. The compressed image is an image indicated by an image signal obtained such that an information amount is compressed to ¼ of that of an original image signal by repeating encoding and decoding by a coding method of a moving picture expert group (MPEG)-4 advanced video coding (AVC). Wave-like noise (mosquito noise) occurs around the bright region and the dark region of the image 88, and the boundary is unclear. The image 89 is an image indicated by a brightness signal obtained by performing the processing according to the present modified example on the brightness signal related to the image 88. In the image 89, the boundary between the bright region and the dark region is clear, and the wave-like noise is removed.

Figure 28:
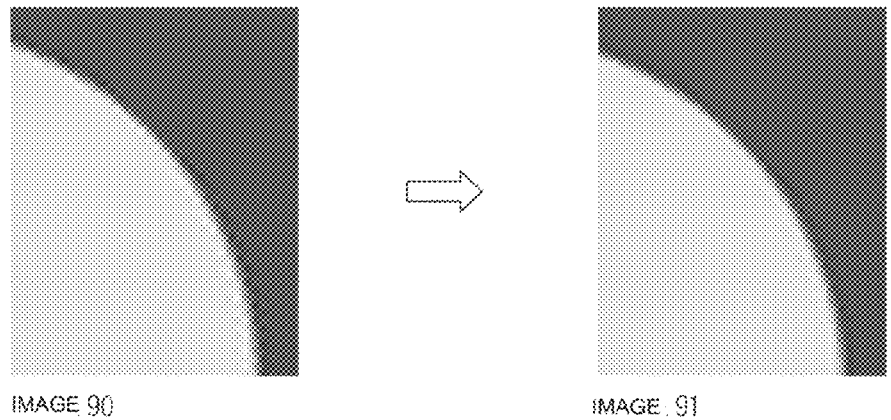
FIG. 28 illustrates other exemplary images related to brightness signals before and after processing according to the present embodiment is performed.

FIG. 28 illustrates other exemplary images (images 90 and 91) related to brightness signals before and after the processing according to the present embodiment is performed.

The image 90 is an image indicated by a brightness signal obtained by scaling a brightness signal in which separation (YC separation) of a color-difference signal from a composite image signal is inappropriate with a triple enlargement factor. Granular noise (composite noise) occurs around the bright region and the dark region of the image 90, and the boundary is unclear. The image 91 is an image indicated by a brightness signal obtained by performing the processing according to the present modified example on the brightness signal related to the image 90. In the image 91, the boundary between the bright region and the dark region is clearer, and the granular noise is reduced.

Figure 29:
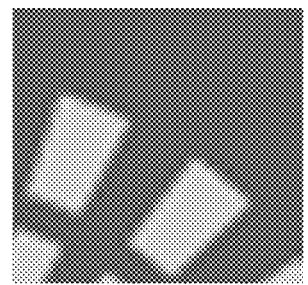
FIG. 29 illustrates exemplary images related to brightness signals before and after processing according to a related art and the present embodiment is performed.
Figure 29:
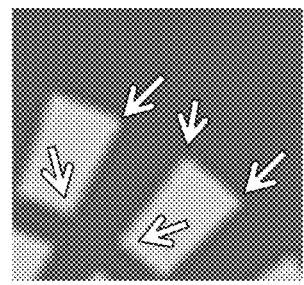
Figure 29:
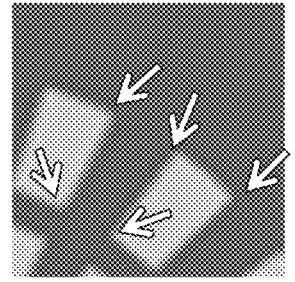

FIG. 29 illustrates exemplary images (images 92 to 94) related to brightness signals before and after the processing according to the related art and the present embodiment is performed.

The image 92 is another exemplary image indicated by a brightness signal obtained by scaling a brightness signal related to a low resolution image with a triple enlargement factor. Step-like noise occurs in around a bright region and a dark region of the image 92, and the boundary is unclear. The image 93 is an image indicated by a brightness signal obtained through the processing device disclosed in Patent Literature 1 for the brightness signal related to the image 92. In the image 93, the boundary between the bright region and the dark region is clearer, and the step-like noise is reduced.

However, in the image 93, at corner points indicated by end points of arrows, the boundary is more unclear than the periphery thereof, and noise is not removed. On the other hand, in the image 94, even at corner points indicated by end points of arrows, the boundary is clear, and noise is more reduced than in the image 93.

In the above embodiment, the antenna 10 is not limited to a radio wave related to television broadcasting and may receive a radio wave related to public wireless communication.

The above description has proceeded under the assumption that a color system of a generated image signal is a YCbCr color system, but when a color system of an image signal is different (for example, an RGB color system), the Y/C separating unit 12 may be omitted. When a generated image signal is indicated by a color system configured with signal values indicating brightness of respective colors (for example, an RGB color system), the image processing unit 20 may perform processing on signal values of respective colors.

In the above embodiment, by the contour direction estimating unit 21, the contour directions θ (before quantization) calculated for respective pixels may be averaged within an image block including a predetermined number (for example, 3 in the horizontal direction and 3 in the vertical direction, that is, a total of 9) of neighboring pixels centering on the pixel of interest. The contour direction estimating unit 21 quantizes the averaged contour direction. As a result, it is possible to smooth an error locally and notably occurring in the contour direction between pixels and reproduce a natural image as a whole.

In the above embodiment, in the differential filter, the range of the differential direction (the x direction) in which the filter coefficient $W_x(u',v')$ is 1 and the range of the differential direction in which the filter coefficient $W_x(u',v')$ is −1 may not be the same in the direction (the y direction) vertical to the differential direction. When the range of the differential direction in which the filter coefficient $W_x(u',v')$ is 1 and the range of the differential direction in which the filter coefficient $W_x(u',v')$ is −1 are symmetric with respect to u'=0, and v' is 0, it is preferable that the ranges be n or larger. For example, the range of the differential direction in which the filter coefficient $W_x(u',v')$ is 1 may be n when v'=0 and may be smaller than n when v'≠0.

Similarly, the range of the differential direction (the y direction) in which the filter coefficient $W_y(u',v')$ is 1 and the range of the differential direction in which the filter coefficient $W_y(u',v')$ is −1 may not be the same in the direction (the x direction) vertical to the differential direction. When the range of the differential direction in which the filter coefficient $W_y(u',v')$ is 1 and the range of the differential direction in which the filter coefficient $W_y(u',v')$ is −1 are symmetric with respect to v'=0, and u' is 0, it is preferable that the ranges be n or larger. For example, the range of the differential direction in which the filter coefficient $W_y(u',v')$ is 1 may be n when u'=0 and may be smaller than n when u'≠0.

In the above embodiment, some components of the display device 1, for example, the Y/C separating unit 12, the scaling unit 13, the image format converting unit 14, and the image processing units 20, 30, and 40 may be implemented by a computer. In this case, a program for implementing this control function is recorded in a computer readable recording medium, and the program may be implemented such that the program recorded in the recording medium is read and executed by a computer system. Here, the "computer system" is assumed to be a computer system installed in the display device 1 and include an operating system (OS) and hardware such as a peripheral device. The "computer readable recording medium" refers to a storage device such as a flexible disk, a magneto optical disc, read only memory (ROM), a portable medium such as a CD-ROM, or a hard disk installed in a computer system. The "computer readable recording medium" may also include a medium holding a program dynamically during a short period of time such as a communication line when a program is transmitted via a network such as the Internet or a communication line such as a telephone line and a medium holding a program for a certain period of time such as a volatile memory in a computer system serving as a server or a client in this case. The program may implement some functions among the above-described functions and may implement the above-described functions in combination with a program previously stored in a computer system.

In the above embodiment, some or all components of the display device 1 may be implemented as integrated circuits (ICs) such as large scale integration (LSI). Each of the functional blocks of the display device 1 may be implemented as a processor, and all or some of the functional blocks may be integrated and implemented as a processor. An IC technique is not limited to the LSI, and implementation may be performed by a dedicated circuit or a general-purpose processor. Further, when an IC technique replacing the LSI is developed with the advance of semiconductor technology, an IC by such technique may be used.

One embodiment of the invention have been described above in detail with reference to the appended drawings, but a concrete constitution is not limited to the above embodiment, and various design changes or the like can be made within the scope not departing from the gist of the invention.

INDUSTRIAL APPLICABILITY

The invention can be applied to an image display device such as a liquid crystal display television.

REFERENCE SIGNS LIST

1 Display device
10 Antenna unit
11 Input unit
12 Y/C separating unit
13 Scaling unit
14 Image format converting unit
15 Display unit
20, 30, 40 Image processing unit
21 Contour direction estimating unit
22 Direction evaluating unit
23, 43 Reference region weighting processing unit
24, 34 Pre-processing unit
25, 35 Product-sum operation unit
26, 36 Composition operation unit

The invention claimed is:
1. An image processing device, comprising:
a contour direction estimating integrated circuit or processor that estimates a contour direction in which signal values are constant values for each pixel;
a direction evaluating integrated circuit or processor that decides an evaluation value of each reference pixel of the pixel based on the contour direction of the pixel estimated by the contour direction estimating integrated circuit or processor and a contour direction of each reference pixel serving as a pixel in a reference region corresponding to the pixel for each pixel;

a reference region weighting processing integrated circuit or processor that decides a weighting coefficient of the reference pixel based on the contour direction of the pixel estimated by the contour direction estimating integrated circuit or processor and a direction of each reference pixel of the pixel from the pixel; and a composition operation integrated circuit or processor that smooths a signal value of the pixel based on the evaluation value decided by the direction evaluating integrated circuit or processor and the weighting coefficient decided by the reference region weighting processing integrated circuit or processor using a signal value of the reference pixel of the pixel.

2. The image processing device according to claim 1, wherein the reference region weighting processing integrated circuit or processor decides the weighting coefficient of the reference pixel in a direction of a predetermined range from the contour direction of the pixel to be a value larger than the weighting coefficient of the reference pixel in the direction outside the predetermined range.

3. The image processing device according to claim 1, wherein the direction evaluating integrated circuit or processor decides the evaluation value such that the evaluation value increases as a difference between the contour direction of the pixel and the contour direction of the reference pixel of the pixel decreases.

4. The image processing device according to claim 1, wherein the composition operation integrated circuit or processor smooths the signal value of the pixel based on a differential value between the signal value of each reference pixel corresponding to the pixel and the signal value of the pixel.

5. The image processing device according to claim 1, wherein the composition operation integrated circuit or processor smooths the signal value of the pixel using the weighting coefficient of each reference pixel in the direction of the predetermined range from the contour direction of the pixel and the evaluation value.

6. An image display device, comprising:
a contour direction estimating integrated circuit or processor that estimates a contour direction in which signal values are constant values for each pixel;
a direction evaluating integrated circuit or processor that decides an evaluation value of each reference pixel of the pixel based on the contour direction of the pixel estimated by the contour direction estimating integrated circuit or processor and a contour direction of each reference pixel serving as a pixel in a reference region corresponding to the pixel for each pixel;
a reference region weighting processing integrated circuit or processor that decides a weighting coefficient of the reference pixel based on the contour direction of the pixel estimated by the contour direction estimating integrated circuit or processor and a direction of each reference pixel of the pixel from the pixel; and
a composition operation integrated circuit or processor that smooths a signal value of the pixel based on the evaluation value decided by the direction evaluating integrated circuit or processor and the weighting coefficient decided by the reference region weighting processing integrated circuit or processor using a signal value of the reference pixel of the pixel.

7. The image display device according to claim 6, wherein the reference region weighting processing integrated circuit or processor decides the weighting coefficient of the reference pixel in a direction of a predetermined range from the contour direction of the pixel to be a value larger than the weighting coefficient of the reference pixel in the direction outside the predetermined range.

8. The image display device according to claim 6, wherein the direction evaluating integrated circuit or processor decides the evaluation value such that the evaluation value increases as a difference between the contour direction of the pixel and the contour direction of the reference pixel of the pixel decreases.

9. The image display device according to claim 6, wherein the composition operation integrated circuit or processor smooths the signal value of the pixel based on a differential value between the signal value of each reference pixel corresponding to the pixel and the signal value of the pixel.

10. The image display device according to claim 6, wherein the composition operation integrated circuit or processor smooths the signal value of the pixel using the weighting coefficient of each reference pixel in the direction of the predetermined range from the contour direction of the pixel and the evaluation value.

11. An image processing method of an image processing device, comprising:
calculating a contour direction by estimating the contour direction in which signal values are constant values for each pixel through the image processing device;
calculating a direction evaluation value by deciding an evaluation value of each reference pixel of the pixel based on the estimated contour direction of the pixel and a contour direction of each reference pixel serving as a pixel in a reference region corresponding to the pixel for each pixel through the image processing device;
calculating a reference region weighting calculation by deciding a weighting coefficient of the reference pixel based on the estimated contour direction of the pixel and a direction of each reference pixel of the pixel from the pixel through the image processing device; and
smoothing a signal value of the pixel based on the decided evaluation value and the decided weighting coefficient using a signal value of the reference pixel of the pixel through the image processing device.

12. The image processing method according to claim 11, wherein the calculating of the reference region weighting includes deciding the weighting coefficient of the reference pixel in a direction of a predetermined range from the contour direction of the pixel to be a value larger than the weighting coefficient of the reference pixel in the direction outside the predetermined range.

13. The image processing method according to claim 11, wherein the calculating of the direction evaluation value includes deciding the evaluation value such that the evaluation value increases as a difference between the contour direction of the pixel and the contour direction of the reference pixel of the pixel decreases.

14. The image processing method according to claim 11, wherein the smoothing of the signal value of the pixel is based on a differential value between the signal value of each reference pixel corresponding to the pixel and the signal value of the pixel.

15. The image processing method according to claim 11, wherein the smoothing of the signal value of the pixel uses the weighting coefficient of each reference pixel in the direction of the predetermined range from the contour direction of the pixel and the evaluation value.

* * * * *